US012605764B2

(12) United States Patent
Fan et al.

(10) Patent No.: US 12,605,764 B2
(45) Date of Patent: Apr. 21, 2026

(54) SYSTEMS AND METHODS FOR HIGH REACTANT CONVERSION THROUGH MULTIPLE REACTANT FLOW RATIO STAGING

(71) Applicant: OHIO STATE INNOVATION FOUNDATION, Columbus, OH (US)

(72) Inventors: Liang-Shih Fan, Columbus, OH (US); Andrew Tong, Columbus, OH (US); Liang Zeng, Columbus, OH (US); Yitao Zhang, Columbus, OH (US); Frank Kong, Columbus, OH (US); Yu-Yen Chen, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 606 days.

(21) Appl. No.: 18/003,457

(22) PCT Filed: Jun. 29, 2021

(86) PCT No.: PCT/US2021/039622
§ 371 (c)(1),
(2) Date: Dec. 27, 2022

(87) PCT Pub. No.: WO2022/006112
PCT Pub. Date: Jan. 6, 2022

(65) Prior Publication Data
US 2023/0241679 A1     Aug. 3, 2023

Related U.S. Application Data

(60) Provisional application No. 63/045,393, filed on Jun. 29, 2020.

(51) Int. Cl.
B22F 9/22 (2006.01)
B01J 6/00 (2006.01)
(Continued)

(52) U.S. Cl.
CPC .................. B22F 9/22 (2013.01); B01J 6/008 (2013.01); B01J 8/003 (2013.01); B01J 8/08 (2013.01);
(Continued)

(58) Field of Classification Search
CPC ... B22F 9/22; B22F 1/145; B01J 6/008; B01J 8/003; B01J 8/08
See application file for complete search history.

(56) References Cited

U.S. PATENT DOCUMENTS

| 971,206 A | 9/1910 | Messerschmitt |
|---|---|---|
| 1,078,686 A | 11/1913 | Lane |

(Continued)

FOREIGN PATENT DOCUMENTS

| CN | 1057486 A | 1/1992 |
|---|---|---|
| CN | 1329761 A | 1/2001 |

(Continued)

OTHER PUBLICATIONS

English translation of CN 112410494 (originally published Feb. 26, 2021), obtained from PE2E search.*

(Continued)

*Primary Examiner* — Humera N. Sheikh
(74) *Attorney, Agent, or Firm* — Michael Best & Friedrich LLP

(57) ABSTRACT

Reactor configurations may include one or more staged inlets and/or one or more staged outlets for gaseous and solid feedstocks. In one embodiment of the present disclosure, a reactor design for gas-solid reaction with one or more additional outlet for gas and/or solid phase is provided. In yet another embodiment, the design for a gas-solid reactor with one side inlet and two outlets for gas phase is described. In one embodiment, a reactor design with pairs of inlet and outlet for both gas and solid phase is provided. In another (Continued)

embodiment, a reactor design with one or more side inlets but only one outlet for gas phase is provided. In yet another embodiment, a reactor design with two inlets at the top/bottom of reactor and two side outlets for gaseous phase is described. In yet another embodiment, a reactor design with one or more side inlets and outlets for both gas and solid phases is provided.

13 Claims, 17 Drawing Sheets

(51) Int. Cl.
 B01J 8/00 (2006.01)
 B01J 8/08 (2006.01)
 B22F 1/145 (2022.01)
(52) U.S. Cl.
 CPC ..... B22F 1/145 (2022.01); B01J 2208/00628 (2013.01); B01J 2208/00761 (2013.01); B22F 2201/013 (2013.01); B22F 2201/04 (2013.01); B22F 2302/25 (2013.01)

(56) References Cited

U.S. PATENT DOCUMENTS

| | | | |
|---|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,382,033 A | 5/1968 | Kitagawa |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 3,801,661 A | 4/1974 | Hart et al. |
| 3,879,514 A | 4/1975 | Dahl |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,151,124 A | 4/1979 | Gidaspow et al. |
| 4,155,832 A | 5/1979 | Cox et al. |
| 4,160,663 A | 7/1979 | Hsieh |
| 4,212,452 A | 7/1980 | Hsieh |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,375,983 A | 3/1983 | Celada et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |

| | | | |
|---|---|---|---|
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,895,821 A | 1/1990 | Kainer et al. |
| 4,902,586 A | 2/1990 | Wertheim |
| 4,957,523 A | 9/1990 | Zarate et al. |
| 5,112,590 A | 5/1992 | Krishnamurthy et al. |
| 5,130,106 A | 7/1992 | Koves et al. |
| 5,365,560 A | 11/1994 | Tam |
| 5,447,024 A | 9/1995 | Ishida et al. |
| 5,456,807 A | 10/1995 | Wachsman |
| 5,509,362 A | 4/1996 | Lyon |
| 5,518,187 A | 5/1996 | Bruno et al. |
| 5,529,599 A | 6/1996 | Calderon |
| 5,545,251 A | 8/1996 | Knop |
| 5,584,615 A | 12/1996 | Micklich |
| 5,630,368 A | 5/1997 | Wagoner |
| 5,730,763 A | 3/1998 | Manulescu et al. |
| 5,762,681 A | 6/1998 | Lee et al. |
| 5,770,310 A | 6/1998 | Nogochi et al. |
| 5,827,496 A | 10/1998 | Lyon |
| 5,858,210 A | 1/1999 | Richardson |
| 5,891,415 A | 4/1999 | Alkhazov et al. |
| 5,965,098 A | 10/1999 | Boegner et al. |
| 5,997,609 A * | 12/1999 | Diehl ..................... C21B 13/14 |
| | | | 266/166 |
| 6,007,699 A | 12/1999 | Cole |
| 6,030,589 A | 2/2000 | Hartweg et al. |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,506,351 B1 | 1/2003 | Jain et al. |
| 6,509,000 B1 | 1/2003 | Choudhary et al. |
| 6,517,631 B2 | 2/2003 | Bland |
| 6,607,704 B2 | 8/2003 | Guttridge et al. |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,067,456 B2 | 6/2006 | Fan et al. |
| 7,244,399 B2 | 7/2007 | Myohanen et al. |
| 7,404,942 B2 | 7/2008 | Sanfilippo et al. |
| 7,429,373 B2 | 9/2008 | Pez et al. |
| 7,496,450 B2 | 2/2009 | Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,601,958 B2 | 12/2013 | Salatino et al. |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 8,877,150 B1 | 11/2014 | Fan et al. |
| 9,017,627 B2 | 4/2015 | Gupta |

(56)        References Cited

U.S. PATENT DOCUMENTS

| | | |
|---|---|---|
| 9,290,386 B2 | 3/2016 | Wasas |
| 9,376,318 B2 | 6/2016 | Fan et al. |
| 9,382,359 B2 | 7/2016 | Kanellopoulos et al. |
| 9,518,236 B2 | 12/2016 | Fan et al. |
| 9,573,118 B2 | 2/2017 | Colozzi et al. |
| 9,616,403 B2 | 4/2017 | Fan et al. |
| 9,777,920 B2 | 10/2017 | Fan et al. |
| 9,790,605 B2 | 10/2017 | Sheehan et al. |
| 9,874,347 B1 | 1/2018 | Uddin et al. |
| 9,903,584 B2 | 2/2018 | Fan et al. |
| 10,010,847 B2 | 7/2018 | Fan et al. |
| 10,081,772 B2 | 9/2018 | Fan et al. |
| 10,144,640 B2 | 12/2018 | Fan et al. |
| 10,501,318 B2 | 12/2019 | Fan et al. |
| 10,865,346 B2 | 12/2020 | Fan et al. |
| 11,111,143 B2 | 9/2021 | Fan et al. |
| 2001/0055559 A1 | 12/2001 | Sanfilippo et al. |
| 2002/0011428 A1 | 1/2002 | Scheuerman |
| 2002/0059864 A1 | 5/2002 | Janssen et al. |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0072699 A1 | 4/2003 | Tonkovich et al. |
| 2003/0102254 A1 | 6/2003 | Eijsbouts et al. |
| 2003/0119658 A1 | 6/2003 | Allison et al. |
| 2003/0124041 A1 | 7/2003 | Neumann et al. |
| 2003/0130360 A1 | 7/2003 | Kindig et al. |
| 2003/0153632 A1 | 8/2003 | Wang et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0092784 A1 | 5/2004 | Legendre |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0021322 A1 | 2/2006 | Haberberger et al. |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0117714 A1 | 5/2007 | Geyer et al. |
| 2007/0157517 A1 | 7/2007 | Tsay et al. |
| 2007/0240407 A1 | 10/2007 | Ruth et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0119419 A1 | 5/2010 | Sprouse et al. |
| 2010/0184589 A1 | 7/2010 | Miyairi et al. |
| 2010/0187159 A1 | 7/2010 | Naunheimer |
| 2010/0212457 A1* | 8/2010 | Drnevich ................ C21B 7/002 |
| | | 266/144 |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0138788 A1 | 6/2011 | Kanda et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0198861 A1 | 8/2011 | Jallais et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0115715 A1 | 5/2012 | Wolters et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2012/0308462 A1 | 12/2012 | Grant et al. |
| 2013/0071314 A1 | 3/2013 | Gupta |
| 2013/0085365 A1 | 4/2013 | Marashdeh et al. |
| 2013/0125462 A1 | 5/2013 | Greiner et al. |
| 2013/0149650 A1 | 6/2013 | Gauthier et al. |
| 2013/0255272 A1 | 10/2013 | Ajhar et al. |
| 2013/0261355 A1 | 10/2013 | Stamires |
| 2014/0021028 A1 | 1/2014 | Paganessi et al. |
| 2014/0134096 A1 | 5/2014 | Angelini et al. |
| 2014/0144082 A1 | 5/2014 | Fan et al. |
| 2014/0275297 A1 | 9/2014 | Velazquez-Vargas et al. |
| 2014/0295359 A1* | 10/2014 | Gauthier ................ F23C 10/01 |
| | | 431/170 |
| 2015/0238915 A1 | 8/2015 | Fan et al. |
| 2015/0291420 A1 | 10/2015 | Colozzi et al. |
| 2015/0343416 A1 | 12/2015 | Fadhel et al. |
| 2016/0002034 A1 | 1/2016 | Fan et al. |
| 2016/0016800 A1 | 1/2016 | Noyes |
| 2016/0023190 A1 | 1/2016 | Fan et al. |
| 2016/0030904 A1 | 2/2016 | Fan et al. |
| 2016/0115026 A1 | 4/2016 | Angelini et al. |
| 2016/0158697 A1 | 6/2016 | Shah et al. |
| 2016/0268616 A1 | 9/2016 | Fan et al. |
| 2017/0015554 A1 | 1/2017 | Siengchum et al. |
| 2017/0106355 A1 | 4/2017 | Colozzi et al. |
| 2018/0296978 A1 | 10/2018 | Peck et al. |
| 2018/0353933 A1 | 12/2018 | Wendland et al. |
| 2019/0003704 A1 | 1/2019 | Aranda et al. |
| 2019/0031507 A1 | 1/2019 | Moghtaderi et al. |
| 2019/0152778 A1 | 5/2019 | Fan et al. |
| 2019/0232220 A1 | 8/2019 | Fan et al. |
| 2020/0156032 A1 | 5/2020 | Fan et al. |

FOREIGN PATENT DOCUMENTS

| | | | |
|---|---|---|---|
| CN | 1325319 A | | 12/2001 |
| CN | 1454711 A | | 11/2003 |
| CN | 1501534 A | | 6/2004 |
| CN | 101389734 A | | 3/2009 |
| CN | 101426885 A | | 5/2009 |
| CN | 102187153 A | | 9/2011 |
| CN | 102388005 A | | 3/2012 |
| CN | 102612625 A | | 7/2012 |
| CN | 102639213 A | | 8/2012 |
| CN | 102686301 A | | 9/2012 |
| CN | 103468322 A | | 12/2013 |
| CN | 112410494 A | * | 2/2021 |
| DE | 102010028816 A1 | | 11/2011 |
| EP | 0161970 A1 | | 11/1985 |
| EP | 1134187 A2 | | 9/2001 |
| EP | 1445018 A1 | | 8/2004 |
| EP | 1580162 A2 | | 9/2005 |
| EP | 1845579 A2 | | 10/2007 |
| EP | 1933087 A2 | | 6/2008 |

(56)                    References Cited

FOREIGN PATENT DOCUMENTS

| EP | 2279785 | A2 | 2/2011 |
| EP | 2441816 | A1 | 4/2012 |
| EP | 2450420 | A1 | 5/2012 |
| EP | 2495030 | A2 | 9/2012 |
| EP | 2515038 | A1 | 10/2012 |
| EP | 2601443 | A0 | 6/2013 |
| EP | 1976633 | B1 | 3/2014 |
| FR | 2924035 | A1 | 5/2009 |
| JP | H03-68898 | A | 3/1991 |
| JP | H10249153 | A | 9/1998 |
| JP | 2006-502957 | A | 1/2006 |
| KR | 20060096609 | A | 9/2006 |
| KR | 101364823 | B1 | 2/2014 |
| TW | 406055 | B | 9/2000 |
| TW | 426728 | B | 3/2001 |
| WO | WO1990/013773 | A1 | 11/1990 |
| WO | WO1999/065097 | A1 | 12/1999 |
| WO | WO2000/022690 | A1 | 4/2000 |
| WO | WO2000/068339 | A1 | 11/2000 |
| WO | WO2001/042132 | A1 | 6/2001 |
| WO | WO2003/070629 | A1 | 8/2003 |
| WO | WO2005/066468 | A2 | 7/2005 |
| WO | WO2007/082089 | A2 | 7/2007 |
| WO | WO2007/122498 | A2 | 11/2007 |
| WO | WO2007/134075 | A2 | 11/2007 |
| WO | WO2008/019079 | A2 | 2/2008 |
| WO | WO2008/071215 | A1 | 6/2008 |
| WO | WO2008/082312 | A1 | 7/2008 |
| WO | WO2008/115076 | A2 | 9/2008 |
| WO | WO2009/007200 | A2 | 1/2009 |
| WO | WO2009/008565 | A1 | 1/2009 |
| WO | WO2009/009388 | A2 | 1/2009 |
| WO | WO2009/021258 | A1 | 2/2009 |
| WO | WO2009/023515 | A2 | 2/2009 |
| WO | WO2009/114309 | A2 | 9/2009 |
| WO | WO2010/037011 | A2 | 4/2010 |
| WO | WO2010/063923 | A2 | 6/2010 |
| WO | WO2010/126617 | A1 | 11/2010 |
| WO | WO2011/021161 | A2 | 2/2011 |
| WO | WO2011/031752 | A2 | 3/2011 |
| WO | WO2011/031755 | A1 | 3/2011 |
| WO | WO2011/084734 | A2 | 7/2011 |
| WO | WO2012/064712 | A1 | 5/2012 |
| WO | WO2012/077978 | A2 | 6/2012 |
| WO | WO2012/144899 | A2 | 10/2012 |
| WO | WO2012/155054 | A1 | 11/2012 |
| WO | WO2012/155059 | A1 | 11/2012 |
| WO | WO2013/040645 | A1 | 3/2013 |
| WO | WO2014/085243 | A1 | 6/2014 |
| WO | WO2014/091024 | A1 | 6/2014 |
| WO | WO2014/152814 | A1 | 9/2014 |
| WO | WO2011/153568 | A1 | 12/2014 |
| WO | WO2014/195904 | A1 | 12/2014 |
| WO | 2015/016956 | A1 | 2/2015 |
| WO | WO2016/053941 | A1 | 4/2016 |
| WO | WO2017/162427 | A1 | 9/2017 |
| WO | WO2018/166812 | A1 | 9/2018 |
| WO | WO2020/175426 | A1 | 9/2020 |
| WO | WO2020/210865 | A1 | 10/2020 |
| WO | WO2021/162751 | A1 | 8/2021 |

OTHER PUBLICATIONS

Tsoncheva et al. "Critical evaluation of the state of iron oxide nanoparticles on different mesoporous silicas prepared by an impregnation method" Microporous and Mesoporous Materials 112 (2008) 327-337.

Tsoncheva et al., "Preparation, characterization and catalytic behavior in methanol decomposition of nanosized iron oxide particles within large pore ordered mesoporous silicas", Micropor. Mesopor. Mater. 89 (2006) 209-218.

Marban et al. "A highly active, selective and stable copper/cobalt-structured nanocatalyst for methanol decomposition" Applied Catalysis B: Environmental, 99 (2010) 257-264 (Year: 2010).

Nanoparticle Technology Handbook, Chapter 2, <https://www.sciencedirect.com/science/article/pii/B9780444531223500052?ref=pdf_download&fr=RR-2&rr=8d3b770a3f0f3035>(Year: 2008).

Dimitrov et al. "Mesoporous TiO2 powders as host matrices for iron nanoparticles. Effect of the preparation procedure and doping with Hf" Nano-Structures & Nano-Objects 7 (2016) 56-63 (Year: 2016).

CRC Handbook of Chemistry and Physics 95th Edition, p. 4-138 and p. 4-144 (Year: 2014).

United States Patent Office for U.S. Appl. No. 17/636,160 dated Oct. 31, 2024 (14 pages).

Abad et al., "Chemical-looping combustion in a 300 W continuously operating reactor system using a manganese-based oxygen carrier," Fuel, 2006, vol. 85, Issue 9, pp. 1174-1185.

Abad et al., "Reduction Kinetics of CU-, Ni-, and Fe-Based Oxygen Carriers Using Syngas (CO + H2) for Chemical-Looping Combustion," Energy Fuels, 2007, 21 (4), pp. 1843-1853.

Abad et al., "The use of iron oxide as oxygen carrier in a chemical-looping reactor," Fuel, 2007, vol. 86, Issues 7-8, pp. 1021-1035.

Abdallah et al., "Comparison of mesoporous silicate supports for the immobilisation and activity of cytochrome c and lipase," J. Mol. Catal. B: Enzym., 2014, 108, 82-88.

Adanez et al., "Progress in Chemical-Looping Combustion and Reforming technologies," Progress in Energy and Combustion Science, 2012, vol. 38, Issue 2, pp. 215-282.

Adanez et al., "Selection of oxygen carriers for chemical-looping combustion," Energy & Fuels, American Chemical Society, 2004, vol. 18, No. 2, pp. 371-377.

Ahern et al., "Comparison of fenofibratemesoporous silica drug-loading processes for enhanced drug delivery," Eur. J. Pharm. Sci., 2013, 50, 400-409.

Alalwan et al., "Co3O4 nanoparticles as oxygen carriers for chemical looping combustion: A materials characterization approach to understanding oxygen carrier performance," Chemical Engineering Journal, 2017, 319, 279-287.

Alalwan et al., "α-Fe2O3 Nanoparticles as Oxygen Carriers for Chemical Looping Combustion: An Integrated Materials Characterization Approach to Understanding Oxygen Carrier Performance, Reduction Mechanism, and Particle Size Effects," Energy Fuels, 2018, 32, 7959-7970.

Anisimov et al., "Density-functional calculation of effective Coulomb interactions in metals," Phys. Rev. B, 1991, 43, 7570.

Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.

Balasubramanian et al., "Hydrogen from methane in a single-step process," Chem Engr Science, 1999, 54(15-16), 3543.

Barreca et al., "Methanolysis of styrene oxide catalysed by a highly efficient zirconium-doped mesoporous silica," Appl. Catal. A, 2006, 304, 14-20.

Bell et al., "H2 Production via Ammonia Decomposition Using Non-Noble Metal Catalysts: A Review," Top Catal, 2016, 59, 1438-1457.

Burke et al., "Large pore bi-functionalised mesoporous silica for metal ion pollution treatment," J. Hazard. Mater., 2009, 164, 229-234.

Cao et al., "Investigation of Chemical Looping Combustion by Solid Fuels. 1. Process Analysis," Energy Fuels, 2006, 20(5), pp. 1836-1844.

Carrero et al., "A critical literature review of the kinetics for the oxidative dehydrogenation of propane over well-defined supported vanadium oxide catalysts," ACS Catalysis, 2014, 4: 3357-3380.

Cavani et al., "Oxidative dehydrogenation of ethane and propane: How far from commercial implementation?" Catalysis Today, 2007, 127(1): 113-131.

Cheng et al., "Carbon Dioxide Adsorption and Activation on Ceria (110): A density functional theory study," J. Chem. Phys. 2013, 138, 014702.

Cheng et al., "Methane Adsorption and Dissociation on Iron Oxide Oxygen Carrier: Role of Oxygen Vacancy," Phys. Chem. Chem. Phys. 2016, 18, 16423-16435.

(56)        References Cited

OTHER PUBLICATIONS

Cheng et al., "Oxygen vacancy promoted methane partial oxidation over iron oxide oxygen carrier in chemical looping process," Phys. Chem. Chem. Phys., 2016, 18, 32418-32428.

Cheng et al., "Propagation of Olefin Metathesis to Propene on WO3 Catalysts: A Mechanistic and Kinetic Study," ACS Catal. 2015, 5, 59-72.

Cho et al., "Comparison of iron-, nickel-, copper- and manganese-based oxygen carriers for chemical-looping combustion," Fuel, 2004, vol. 83, Issue 9, pp. 1215-1225.

Chung et al., "Chemically and physically robust, commercially-viable iron-based composite oxygen carriers sustainable over 3000 redox cycles at high temperatures for chemical looping applications," Energy Environ. Sci., 2017, 10, 2318-2323.

Coleman et al., "Synthesis and characterization of dimensionally ordered semiconductor nanowires within mesoporous silica," J. Am. Chem. Soc., 2001, 123, 7010-7016.

Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.

De Diego et al., "Development of Cu-based oxygen carriers for chemical-looping combustion," Fuel, 2004, vol. 83, Issue 13, pp. 1749-1757.

De Klerk, "Gas-to-Liquid Conversion." Natural Gas Conversion Technologies Workshop of ARPA-E. U.S. Department of Energy, Houston, TX. vol. 13 (2012).

Delaney et al., "Development of chemically engineered porous metal oxides for phosphate removal," J. Hazard. Mater., 2011, 185, 382-391.

Delaney et al., "Porous silica spheres as indoor air pollutant scavengers," J. Environ. Monit., 2010, 12, 2244-2251.

Denton et al., "Simultaneous Production of High-Purity Hydrogen and Sequestration-Ready CO2 from Syngas," 2003.

EIA—Independent Statistics and Analysis. U.S. Department of Energy, U.S. Energy Information Administration "Annual Energy Outlook 2015 with Projections to 2040," Apr. 2015.

EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.

EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.

EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.

Environmental Protection Agency, "Geological CO2 Sequestration Technology and Cost Analysis," Technical Support Document, p. i-vi & pp. 1-61, Jun. 2008.

Faezad Othman et al., "Utilization of Low-Grade Iron Ore in Ammonia Decomposition," Procedia Chemistry, 2016, 19:119-124.

Faezad Othman et al., "Utilization of Malaysian Low Grade Iron Ore as Medium for Ammonia Decomposition," ARPN Journal of Engineering and Applied Sciences, 2015, 10(22):17286-17288.

Fan et al., "Chemical looping processes for CO2 capture and carbonaceous fuel conversion prospect and opportunity," Energy Environmental Science, 2012, p. 7254-7280.

Fan et al., "Utilization of chemical looping strategy in coal gasification processes," Particuology, 2008, vol. 6, Issue 3, pp. 131-142.

Fan et al., "Chemical-Looping Technology Platform," AIChE Journal, 61(1), 2-22 (2015).

Fan, "Chemical Looping Systems for Fossil Energy Conversions," Wiley-AIChE: Hoboken, NJ, U.S.A.; 2010.

Flynn et al., "Pervaporation performance enhancement through the incorporation of mesoporous silica spheres into PVA membranes," Sep. Purif. Technol., 2013, 118, 73-80.

Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.

Forzatti, "Present status and perspectives in de-NOx SCR catalysis." Appl. Catal. A: Gen., 222(1-2), 2001, 221-236.

Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.

Garcia-Labiano et al., "Temperature variations in the oxygen carrier particles during their reduction and oxidation in a chemical-looping combustion system," Chemical Engineering Science, 2005, vol. 60, No. 3, pp. 851-862.

Geldart, "Types of Gas Fluidization," Power Technology, vol. 7, pp. 285-292, 1973.

Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.

Ghoneim et al., "Review on innovative catalytic reforming of natural gas to syngas," World J. Eng. Technol, 2016, 4(1):116-139.

Go et al., "Hydrogen production from two-step steam methane reforming in a fluidized bed reactor," International Journal of Hydrogen Energy, 2009, vol. 34, p. 1301-1309.

Goellner et al., "Baseline analysis of crude methanol production from coal and natural gas," National Energy Technology Laboratory (NETL), US Department of Energy, 2014, 83 pages.

Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).

Grimme et al., "A consistent and accurate ab initio parametrization of density functional dispersion correction (DFT-D) for the 94 elements H—Pu," J. Chem. Phys., 2010, 132, 19.

Grimme et al., "Effect of the damping function in dispersion corrected density functional theory," J. Comput. Chem., 2011, 32, 1456-1465.

Haque, "Microwave energy for mineral treatment processes—a brief review," International Journal of Mineral Processing, vol. 57, pp. 1-24, 1999.

Heliogen, "Heliogen, Replacing fuels with sunlight," <https://heliogen.com/> Accessed Aug. 26, 2020.

Henkelman et al., "A climbing image nudged elastic band method for finding saddle points and minimum energy paths," J. Chem. Phys., 2000, 113, 9901-9904.

Herbst et al., "Relativistic calculations of 4f excitation energies in the rare-earth metals: Further results," Phys. Rev. B, 1978, 17, 3089.

Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.

Hildebrandt et al., "Producing Transportation Fuels with Less Work," Science, Mar. 27, 2009, vol. 323, pp. 1680-1681.

Hossain et al., "Chemical-looping combustion (CLC) for inherent CO2 separations—a review," Chemical Engineering Science, 2008, vol. 63, Issue 18, pp. 4433-4451.

Hsieh et al., "250 kWth high pressure pilot demonstration of the syngas chemical looping system for high purity H2 production with CO2 capture," Applied energy, 2018, 230: 1660-1672.

Hua et al., "Three Dimensional Analysis of Electrical Capacitance Tomography Sensing Fields," 1999 IOP Publishing LTD, vol. 10, pp. 717-725.

Huijgen et al., "Carbon dioxide sequestration by mineral carbonation," ECN-C--03-016, www.ecn.nl/docs/library/report/200e/c03016.pdf, Feb. 2003.

Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).

(56)        References Cited

OTHER PUBLICATIONS

Imanaka et al., "Advances in Direct NOx Decomposition Catalysts," Appl. Catal. A: Gen., 431-432, 2012, 1-8.

Ishida et al., "Evaluation of a Chemical-Looping-Combustion Power-Generation System by Graphic Exergy Analysis," Energy, 12(2), 147-154 (1987).

Iwamoto et al., "Influence of sulfur dioxide on catalytic removal of nitric oxide over copper ion-exchanged ZSM-5 Zeolite." Appl. Catal., 69(2), 1991, 15-19.

Izquierdo et al., "Catalyst Deactivation and Regeneration Processes in Biogas Tri-Reforming Process. The Effect of Hydrogen Sulfide Addition," Catalysts, 2018, 8(12): 19 pages.

Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.

Jin et al., "Development of a Novel Chemical-Looping Combustion: Synthesis of a Looping Material with a Double Metal Oxide of Co0—NiO," Energy & Fuels, 1998, vol. 12, 1272-1277.

Johansson et al., "Combustion of Syngas and Natural Gas in a 300 W Chemical-Looping Combustor," Chemical Engineering Research and Design Volume, 2006, vol. 84, Issue 9, pp. 819-827.

Kaiser et al., "Precombustion and Postcombustion Decarbonization," IEEE, Power Engineering Review, Apr. 2001, pp. 15-17.

Kang et al. "Chemical looping partial oxidation of methane with CO2 utilization on the ceria-enhanced mesoporous Fe2O3 oxygen carrier," Fuel, 2018, 215: 787-798.

Kathe et al., "Modularization strategy for syngas generation in chemical ," AIChE Journal, 2017, 63(8):3343-3360.

Kathe et al., "Chemical Looping Gasification for Hydrogen Enhanced Syngas Production with in-situ CO2 Capture," United States Department of Energy, OSTI: 1185194, (2015).

Kiuchi et al., "Recovery of hydrogen from hydrogen sulfide with metals or metal sulfides," Int. J. Hydrogen Energy, 1982, 7: 477-482.

Koulialias et al., "Ordered defects in Fe 1-x S generate additional magnetic anisotropy symmetries," Journal of Applied Physics, 2018, 123(3): 033902, 10 pages.

Kresse et al., "Ab initio molecular dynamics for liquid metals," Phys. Rev. B, 1993, 47, 558.

Kresse et al., "Efficiency of ab-initio total energy calculations for metals and semiconductors using a plane-wave basis set," Comput. Mater. Sci., 1996, 6, 15-50.

Kresse et al., "Efficient iterative schemes for ab initio total-energy calculations using a plane-wave basis set," Phys. Rev. B, 1996, 54, 11169.

Kumar et al., "Direct air capture of CO2 by physisorbent materials," Angew. Chem., Int. Ed., 2015, 54, 14372-14377.

Leion et al., "Solid fuels in chemical-looping combustion using oxide scale and unprocessed iron ore as oxygen carriers," Fuel, 2009, vol. 88, Issue 10, pp. 1945-1954.

Leion et al., "Solid fuels in chemical-looping combustion," International Journal of Greenhouse Gas Control, 2008, vol. 2, Issue 2, pp. 180-193.

Leion et al., "The use of petroleum coke as fuel in chemical-looping combustion," Fuel, 2007, vol. 86, Issue 12-13, pp. 1947-1958.

Li et al., "Clean coal conversion processes—progress and challenges," The Royal Society of Chemistry, Energy & Environmental Science, Jul. 30, 2008, vol. 1, pp. 248-267.

Li et al., "Ionic Diffusion in the Oxidation of Iron-effect of Support and Its Implications to Chemical Looping Applications," Energy Environ. Sci. 2011, 4, 876-880.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.

Li et al., "Syngas chemical looping gasification process: Bench-scale studies and reactor simulations," AICHE Journal, 2010, vol. 56, Issue 8, pp. 2186-2199.

Li et al., "Syngas Chemical Looping Gasification Process: Oxygen Carrier Particle Selection and Performance," Energy Fuels, 2009, 23(8), pp. 4182-4189.

Lin et al., "Novel Magnetically Separable Mesoporous Fe2O3@SBA-15 Nanocomposite with Fully Open Mesochannels for Protein Immobilization," Chemistry of Materials, 2008, vol. 20, pp. 6617-6622.

Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.

Liu et al., "Recent Advances in Catalytic DeNOx Science and Technology," Catalysis Reviews, 48(1), 2006, 43-89.

Lockwood Greene, "Ironmaking Process Alternative Screening Study, vol. I: Summary Report," Department of Energy United States of America, Oct. 2000, 153 pages.

Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).

Lyngfelt, "Chemical Looping Combustion of Solid Fuels—Status of Development," Applied Energy, 2014, vol. 113, p. 1869-1873.

Lyngfelt, "Oxygen Carriers for Chemical Looping Combustion Operational Experience," 1st International Conference on Chemical Looping, Mar. 2010.

Makepeace et. al., "Ammonia decomposition catalysis using non-stoichiometric lithium imide," Chem. Sci., 2015, 6, 3805.

Mamman et al., "Simultaneous steam and CO2 reforming of methane to syngas over NiO/MgO/SA-5205 in presence and absence of oxygen," Applied Catalysis A, 1998, vol. 168, p. 33-46.

Mao et al., "Facile synthesis of phase-pure FeCr2Se4 and FeCr2S4 nanocrystals via a wet chemistry method," J. Mater. Chem. C, 2014, 2: 3744-3749.

Marashdeh, Q. et al., "A Multimodal Tomography System Based on ECT Sensors," IEEE Sensors Journal, vol. 7, No. 3, 2007, 426-433.

Marashdeh, Q., Advances in Electrical Capacitance Tomography, Dissertation, The Ohio State University, 2006.

Masui et al.,"Direct Decomposition of NO into N2 and O2 Over C-type Cubic Y2O3—Tb4O7—ZrO2," Materials Sciences and Applications, 3(10), 2012, 733-738.

Mattisson et al., "Application of chemical-looping combustion with capture of CO2," Second Nordic Minisymposium on Carbon Dioxide Capture and Storage, Goeteborg, Oct. 26, 2001, pp. 46-51.

Mattisson et al., "Chemical-looping combustion using syngas as fuel," International Journal of Greenhouse Gas control, 2007, vol. 1, Issue 2, pp. 158-169.

Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.

Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.

Mattisson et al., "The use of iron oxide as an oxygen carrier in chemical-looping combustion of methane with inherent separation of CO2," Fuel, 2001, vol. 80, pp. 1953-1962.

Mattisson et al., "Use of Ores and Industrial Products As Oxygen Carriers in Chemical-Looping Combustion," Energy & Fuels, 2009, vol. 23, pp. 2307-2315.

Mihai et al., "Chemical looping methane partial oxidation: The effect of the crystal size and O content of LaFeO3," Journal of Catalysis, 2012, 293:175-185.

Miller et al., "Toward Transformational Carbon Capture," AIChE Journal, 62, 1-10 (2016).

Moreira, "Steam Cracking: Kinetics and Feed Characterization," Dissertation, 2015, 10 pages.

NETL, National Energy Technology Laboratory. U.S. Department of Energy, "Quality Guidelines for Energy System Studies—Specification for Selected Feedstocks." Jan. 2012.

(56) References Cited

OTHER PUBLICATIONS

NETL, National Energy Technology Laboratory. U.S. Department of Energy, "Syngas Contaminant Removal and Conditioning," webpage accessed on Jul. 8, 2018.

Nipattummakul et al., "Hydrogen and syngas production from sewage sludge via steam gasification," Fuel and Energy Abstracts, 2010, 35 (21), 11738-11745.

Ockwig et al., "Membranes for Hydrogen Separation," American Chemical Society, Chem. Rev., Oct. 10, 2007, vol. 107, pp. 4078-4110.

O'Connor et al., "Carbon Dioxide Sequestration by Direct Mineral Carbonation: Results from Recent Studies and Currents Status," Abstract, USDOE Office of Fossil Energy, 2001.

Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).

Ortiz et al., "Hydrogen Production by Auto-Thermal Chemical-Looping Reforming in A Pressurized Fluidized Bed Reactor Using Ni-based Oxygen Carriers," International Journal of Hydrogen Energy, 2010, vol. 35, p. 151-160.

OSHA, "Hydrogen Sulfide in Workplaces," <https://www.osha.gov/SLTC/hydrogensulfide/hydrogensulfide_found.html> webpage accessed Jul. 8, 2018.

Pans et al., "Optimization of H2 production with CO2 capture by steam reforming of methane integrated with a chemical-looping combustion system," International Journal of Hydrogen Energy, 2013, 38(27): 11878-11892.

Park et al., "CO2 Mineral Sequestration: Chemically Enhanced Aqueous Carbonation of Serpentine," The Canadian Journal of Chemical Engineering, 2003, vol. 81, pp. 885-890.

Park et al., "CO2 Mineral Sequestration: physically activated dissolution of serpentine and pH swing process," Chemical Engineering Science, 2004, vol. 59, pp. 5241-5247.

Perdew et al., "Generalized gradient approximation made simple," Phys. Rev. Lett., 1996, 77, 3865.

Pfeifer, "Industrial furnaces-status and research challenges," Energy Procedia, 2017, 120: 28-40.

Pröll et al., "Syngas and a separate nitrogen/argon stream via chemical looping reforming—A 140 KW pilot plant study," Fuel, 2010, vol. 89, Issue 6, pp. 1249-1256.

Qin et al., "Enhanced methane monversion in mhemical looping partial oxidation systems using a copper doping modification," Appl. Catal. B, 2018, 235, 143-149.

Qin et al., "Evolution of Nanoscale Morphology in Single and Binary Metal Oxide Microparticles During Reduction and Oxidation Processes," J. Mater. Chem. A. 2014, 2, 17511-17520.

Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.

Qin et al., "Nanostructure Formation Mechanism and Ion Diffusion in Iron-Titanium Composite Materials with Chemical Looping Redox Reactions," J. Mater. Chem. A. 2015, 3, 11302-11312.

Quin et al., "Improved Cyclic redox reactivity of lanthanum modified iron-based oxygen carriers in carbon monoxide xhemical looping combustion," Journal of Materials Chemistry A, 2017, 8 pages.

Rollmann et al., "First-principles calculation of the structure and magnetic phases of hematite," Phys. Rev. B, 2004, 69, 165107.

Rostrup-Nielsen, "Syngas in Perspective," Catalysis Today, 2002, 71(3-4), 243-247.

Ruchenstein et al., "Carbon dioxide reforming of methane over nickel/alkaline earth metal oxide catalysts," Applied Catalysis A, 1995, vol. 133, p. 149-161.

Russo et al., "Impact of Process Design of on the Multiplicity Behavior of a Jacketed Exothermic CSTR," AICHE Journal, Jan. 1995, vol. 41, No. 1, pp. 135-147.

Ryden et al., "Synthesis gas generation by chemical-looping reforming in a continuously operating laboratory reactor," Fuel, 2006, vol. 85, p. 1631-1641.

Ryden et al., "Using steam reforming to produce hydrogen with carbon dioxide capture by chemical-looping combustion," International Journal of Hydrogen Energy, 2006, 31(10): 1271-1283.

Sassi et al., "Sulfur Recovery from Acid Gas Using the Claus Process and High Temperature Air Combustion ( HiTAC ) Technology," Am. J. Environ. Sci., 2008, 4, 502-511.

Sattler et al., "Catalytic Dehydrogenation of Light Alkanes on Metals and Metal Oxides," Chem Rev, 2014, 114(20): 10613-10653.

Scott et al., "In situ gasification of a solid fuel and CO2 separation using chemical looping," AICHE Journal, 2006, vol. 52, Issue 9, pp. 3325-3328.

Shen et al., "Chemical-Looping Combustion of Biomass in a 10kWth Reactor with Iron Oxide as an Oxygen Carrier," Energy & Fuels, 2009, vol. 23, pp. 2498-2505.

Shen et al., "Experiments on chemical looping combustion of coal with a NiO based oxygen carrier," Combustion and Flame, 2009, vol. 156, Issue 3, pp. 721-728.

Sheppard et al., "Paths to which the nudged elastic band converges," J. Comput. Chem., 2011, 32, 1769-1771.

Shick et al., "Single crystal growth of $CoCr_2S_4$ and $FeCr_2S_4$," Journal of Crystal Growth, 1969, 5(4): 313-314.

Speight, "Gasification processes for syngas and hydrogen production," Gasification for Synthetic Fuel Production, Woodhead Publishing, 2015, 119-146.

Sridhar et al., "Syngas Chemical Looping Process: Design and Construction of a 25 kWth Subpilot Unit," Energy Fuels, 2012, 26(4), pp. 2292-2302.

Steinfeld et al., "Design Aspects of Solar Thermochemical Engineering—A case Study: Two-Step Water-Splitting Cycle Using the Fe3O4/FeO Redox System," Solar Energy, 1999, pp. 43-53.

Steinfeld, "Solar hydrogen production via a two-step water-splitting thermochemical cycle based on Zn/ZnO redox reactions," International Journal of Hydrogen Energy, 2002, vol. 27, pp. 611-619.

Sun et al., "Review: Fundamentals and challenges of electrochemical CO2 reduction using two-dimensional materials," Chem, 2017, 3, 560-587.

Takanabe, "Catalytic Conversion of Methane: Carbon Dioxide Reforming and Oxidative Coupling," Journal of the Japan Petroleum Institute, 2012, 55, 1-12.

Thiollier et al., "Preparation and Catalytic Properties of Chromium-Containing Mixed Sulfides," Journal of Catalysis, 2011, 197(1): 58-67.

Tian et al., "Thermodynamic investigation into carbon deposition and sulfur evolution in a Ca-based chemical-looping combustion system," Chemical Engineering Research & Design, 2011, vol. 89, Issue 9, p. 1524.

Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.

U.S. Department of Energy, NCCTI Energy Technologies Group, Office of Fossil Energy, "CO2 Capture and Storage in Geologic Formations," pp. 34, Revised Jan. 8, 2002.

United States Environmental Protection Agency. "Air Pollution Control Technology Fact Sheet: Selective Catalytic Reforming," <https://www3.epa.gov/ttncatc1/cica/files/fscr.pdf> (2003).

Usachev et al., "Conversion of Hydrocarbons to Synthesis Gas: Problems and Prospects," Petroleum Chemistry, 2011, vol. 51, p. 96-106.

Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.

Vernon et al., "Partial Oxidation of Methane to Synthesis Gas," Catalysis Letters, 1990, vol. 6, p. 181-186.

Wang et al., "Highly efficient metal sulfide catalysts for selective dehydrogenation of isobutane to isobutene," ACS Catalysis, 2014, 4: 1139-1143.

Wang et al., "Isobutane Dehydrogenation over Metal (Fe, Co, and Ni) Oxide and Sulfide Catalysts: Reactivity and Reaction Mechanism," ChemCatChem, Jul. 2014, vol. 6, pp. 2305-2314.

(56)          References Cited

OTHER PUBLICATIONS

Wang et al., "Study of bimetallic interactions and promoter effects of FeZn, FeMn and FeCr Fischer—Tropsch synthesis catalysts," Journal of Molecular Catalysis A: Chemical, 2010, 326:29-40.

Warsito, W. et al., Electrical Capacitance vol. Tomography, 2007, pp. 1-9.

Watanabe, "Electrical properties of $FeCr_2S_4$ and $CoCr_2S_4$," Solid State Communications, 1973, 12(5): 355-358.

Xu et al., "A novel chemical looping partial oxidation process for thermochemical conversion of biomass to syngas," Applied Energy, 2018, 222:119-131.

Yamazaki et al., "Development of highly stable nickel catalyst for methane-steam reaction under low steam to carbon ratio," Applied Catalyst A, 1996, vol. 136, p. 49-56.

Yin et. al., "A mini-review on ammonia decomposition catalysts for on-site generation of hydrogen for fuel cell applications," Applied Catalysis A: General, 2004, 277, 1-9.

Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.

Zeng et al., "Metal oxide redox chemistry for chemical looping processe," Nat Rev Chem., 2018, 2, 349-364.

Zhou et al., "Syngas chemical looping process: Dynamic modeling of a moving-bed reducer," AIChE Journal, 2013, 59(9): 3432-3443.

International Search Report and Written Opinion for Application No. PCT/US2021/039622 dated Dec. 9, 2021 (17 pages).

Liu et al., "Near 100% CO Selective in Nanoscaled Iron-Based Oxygen Carriers for Chemical Looping Methane Partial Oxidation," ArXiv, Cornell University Library, Olin Library Cornell University Ithaca, NY, 14853, Jun. 26, 2019, 14 pages.

Zhang et al., "Catalytic behavior and kinetic features of FeO"x? SBA-15 catalyst for selective oxidation of methane by oxygen," Applied Catalysis A: General, Elsevier, Amsterdam, NL, 2009, 356(1): 103-111.

Liu et al., "Near 100% CO selectivity in nanoscaled iron-based oxygen carriers for chemical looping methane partial oxidation," Nature Communications, 2019, 10: 5503.

European Extended Search Report for Application No. 21832226.1 dated Jun. 6, 2024 (7 pages).

Chinese Patent Office Action for Application No. 202180045806.0 dated Jul. 15, 2025 (27 pages, English translation included).

* cited by examiner

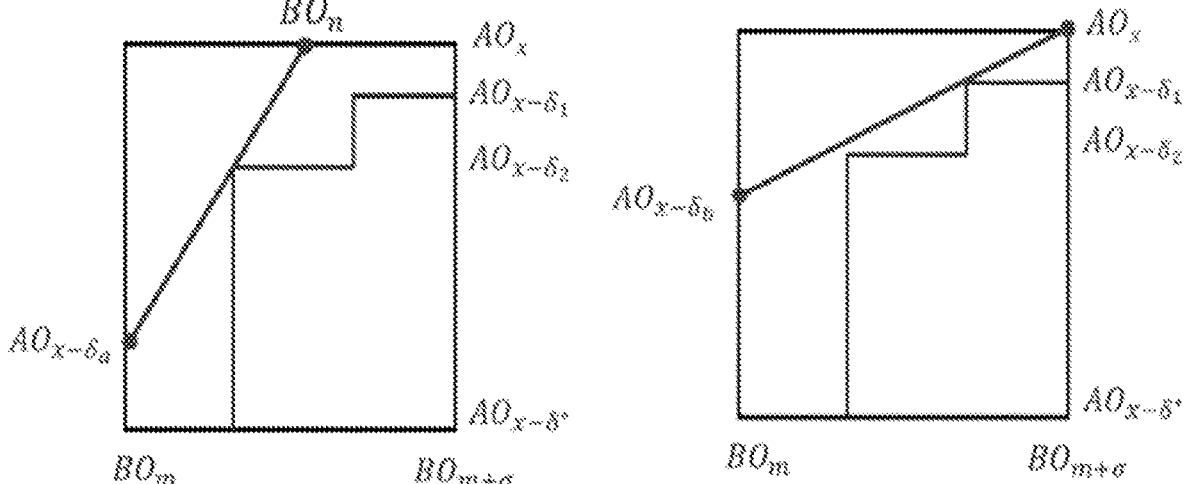
FIG. 2A          FIG. 2B

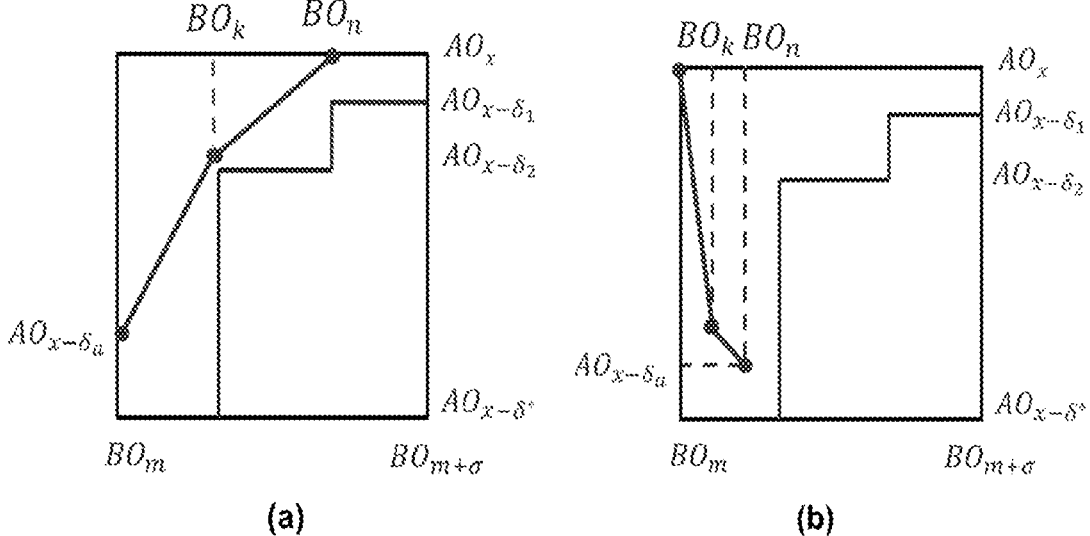
FIG. 4A                    FIG. 4B

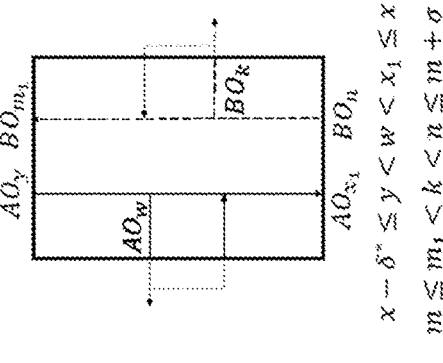

$$x - \delta'' \leq y < w < x_1 \leq x$$
$$m \leq m_1 < k < n \leq m + \sigma$$

FIG. 5D

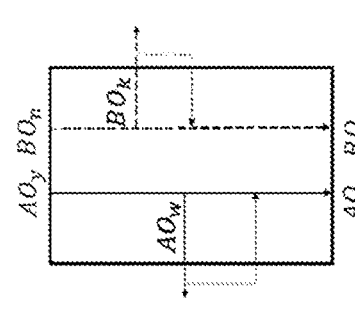

$$x - \delta'' \leq y < w < x_1 \leq x$$
$$m \leq m_1 < k < n \leq m + \sigma$$

FIG. 5H

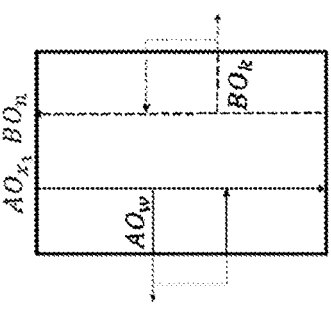
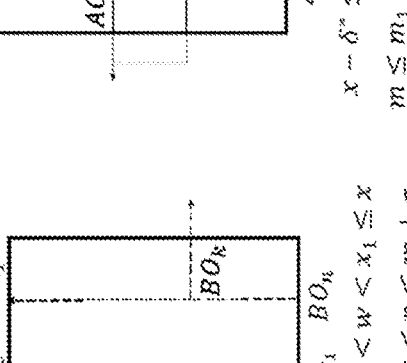

$$x - \delta'' \leq y < w < x_1 \leq x$$
$$m \leq m_1 < k < n \leq m + \sigma$$

FIG. 5C

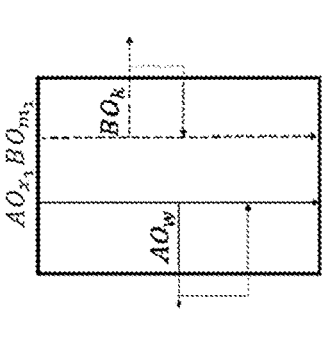
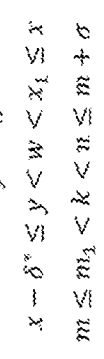
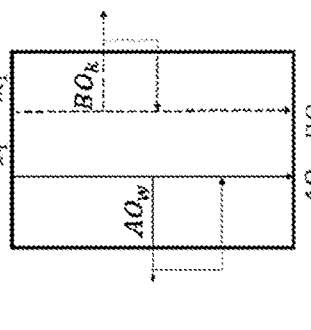

$$x - \delta'' \leq y < w < x_1 \leq x$$
$$m \leq m_1 < k < n \leq m + \sigma$$

FIG. 5G

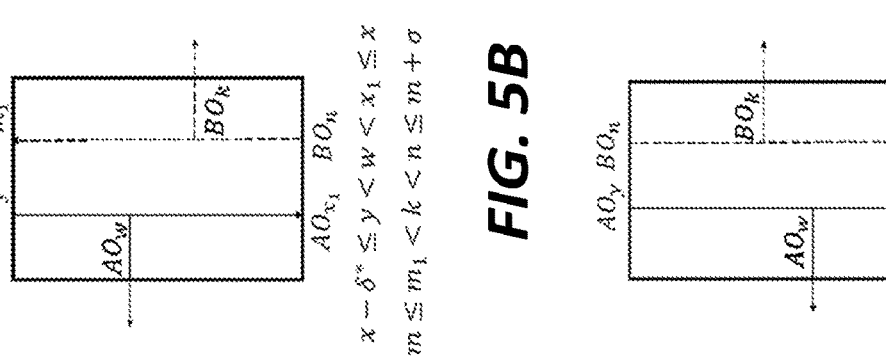

$$x - \delta'' \leq y < w < x_1 \leq x$$
$$m \leq m_1 < k < n \leq m + \sigma$$

FIG. 5B

$$x - \delta'' \leq y < w < x_1 \leq x$$
$$m \leq m_1 < k < n \leq m + \sigma$$

FIG. 5F

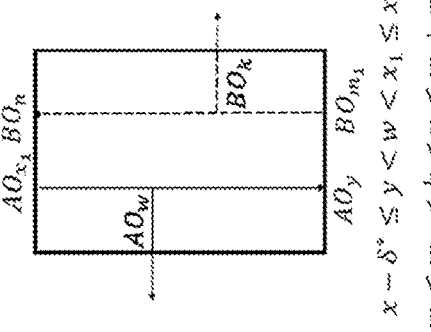

$$x - \delta'' \leq y < w < x_1 \leq x$$
$$m \leq m_1 < k < n \leq m + \sigma$$

FIG. 5A

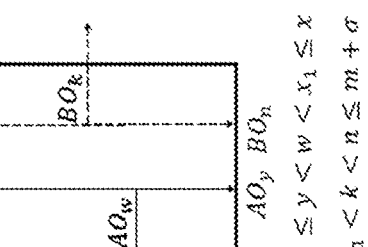
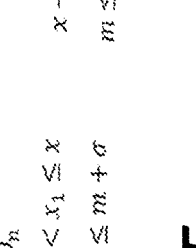
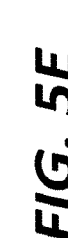

$$x - \delta'' \leq y < w < x_1 \leq x$$
$$m \leq m_1 < k < n \leq m + \sigma$$

FIG. 5E

$$x - \delta^* \leq y < x_1 \leq x$$
$$m \leq m_1 < k < n \leq m + \sigma$$

$$x - \delta^* \leq y < x_1 \leq x$$
$$m \leq n < k < m_1 \leq m + \sigma$$

$$x - \delta^* \leq y < x_1 \leq x$$
$$m \leq m_1 < k < n \leq m + \sigma$$

$$x - \delta^* \leq y < x_1 \leq x$$
$$m \leq n < k < m_1 \leq m + \sigma$$

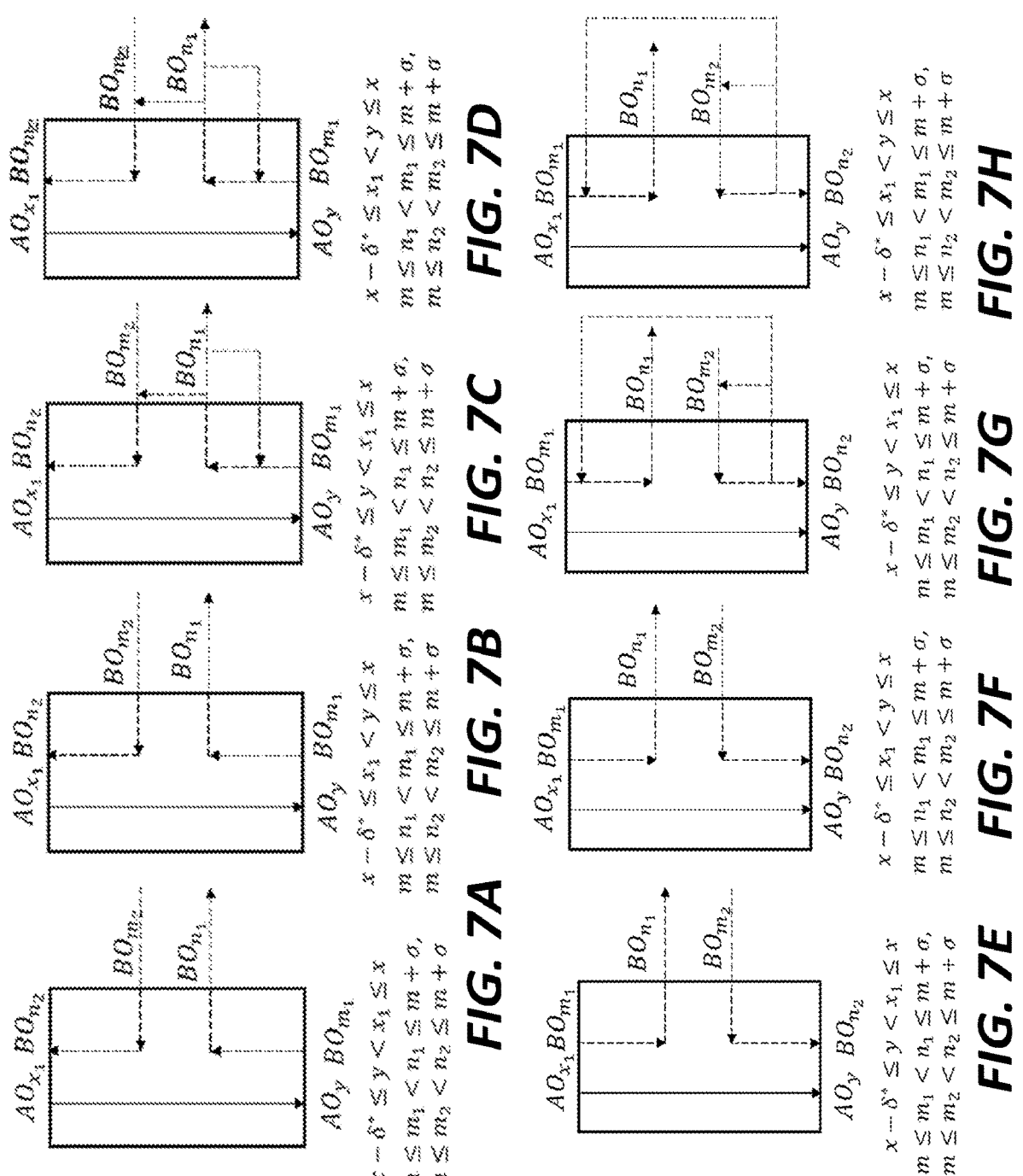

$$x - \delta^x \leq y < x_1 \leq x$$
$$m \leq m_1 < n_1 \leq m + \sigma,$$
$$m \leq n_2 < n_2 \leq m + \sigma$$

FIG. 7A $$x - \delta^x \leq x_1 < y \leq x$$
$$m \leq n_1 < m_1 \leq m + \sigma,$$
$$m \leq n_2 < m_2 \leq m + \sigma$$

FIG. 7B $$x - \delta^x \leq y < x_1 \leq x$$
$$m \leq m_1 < n_1 \leq m + \sigma,$$
$$m \leq m_2 < n_2 \leq m + \sigma$$

FIG. 7C $$x - \delta^x \leq x_1 < y \leq x$$
$$m \leq n_1 < m_1 \leq m + \sigma,$$
$$m \leq n_2 < m_2 \leq m + \sigma$$

FIG. 7D $$x - \delta^x \leq y < x_1 \leq x$$
$$m \leq m_1 < n_1 \leq m + \sigma,$$
$$m \leq m_2 < n_2 \leq m + \sigma$$

FIG. 7E $$x - \delta^x \leq x_1 < y \leq x$$
$$m \leq n_1 < m_1 \leq m + \sigma,$$
$$m \leq n_2 < m_2 \leq m + \sigma$$

FIG. 7F $$x - \delta^x \leq y < x_1 \leq x$$
$$m \leq m_1 < n_1 \leq m + \sigma,$$
$$m \leq m_2 < n_2 \leq m + \sigma$$

FIG. 7G $$x - \delta^x \leq x_1 < y \leq x$$
$$m \leq n_1 < m_1 \leq m + \sigma,$$
$$m \leq n_2 < m_2 \leq m + \sigma$$

FIG. 7H

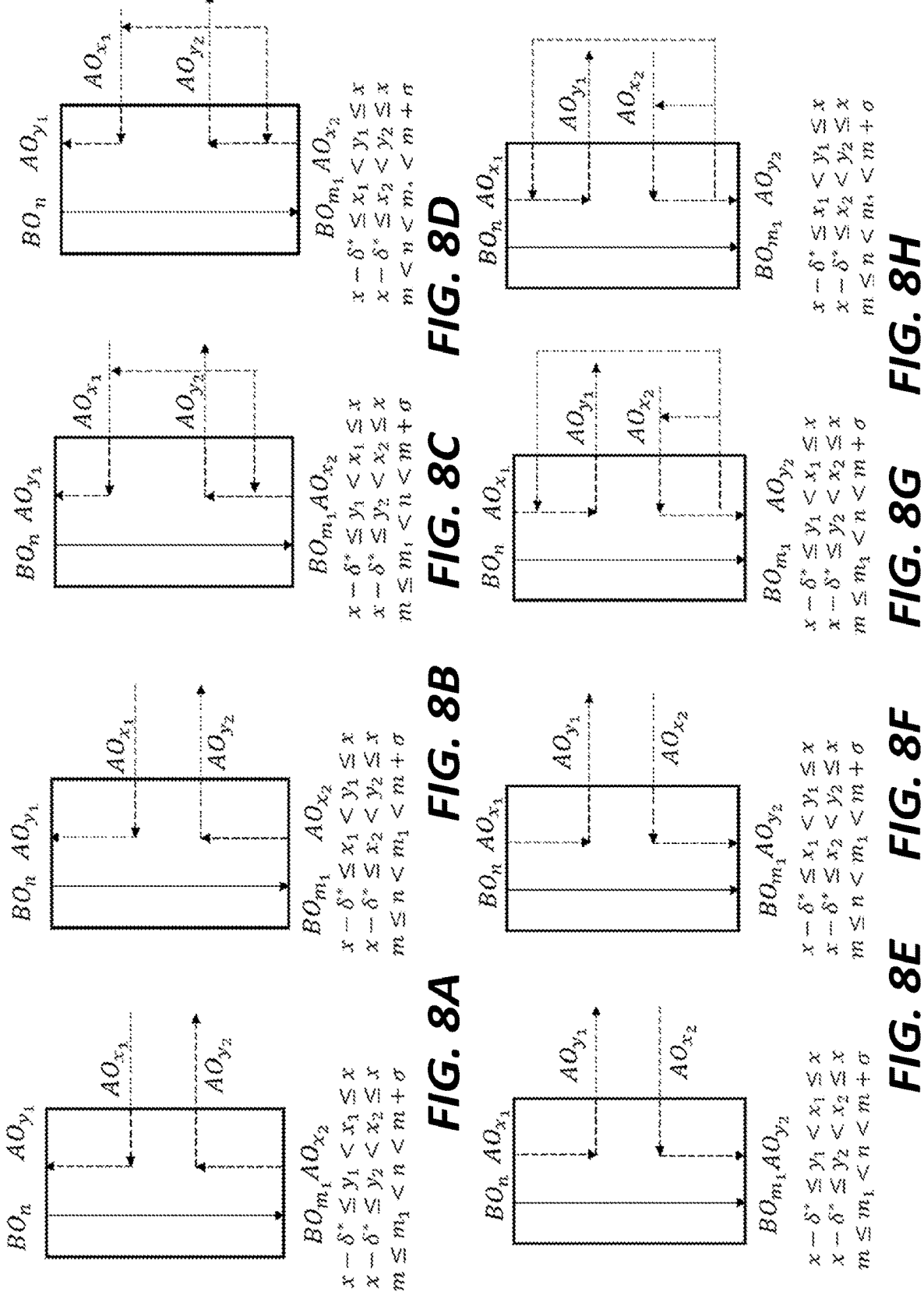

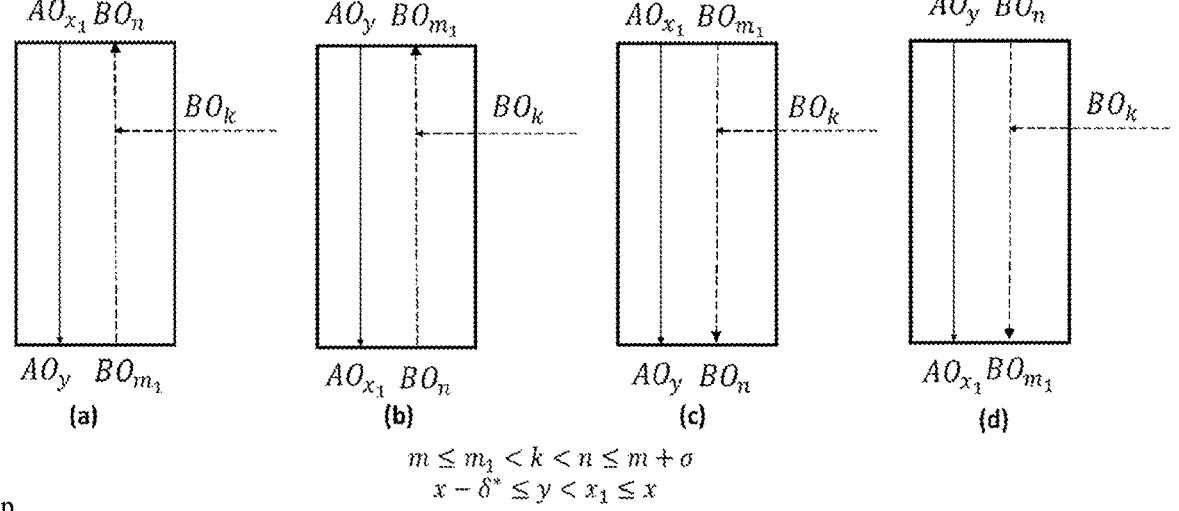
(a)          (b)          (c)          (d)
$$m \leq m_1 < k < n \leq m + \sigma$$
$$x - \delta^* \leq y < x_1 \leq x$$
p
FIG. 9A      FIG. 9B      FIG. 9C      FIG. 9D

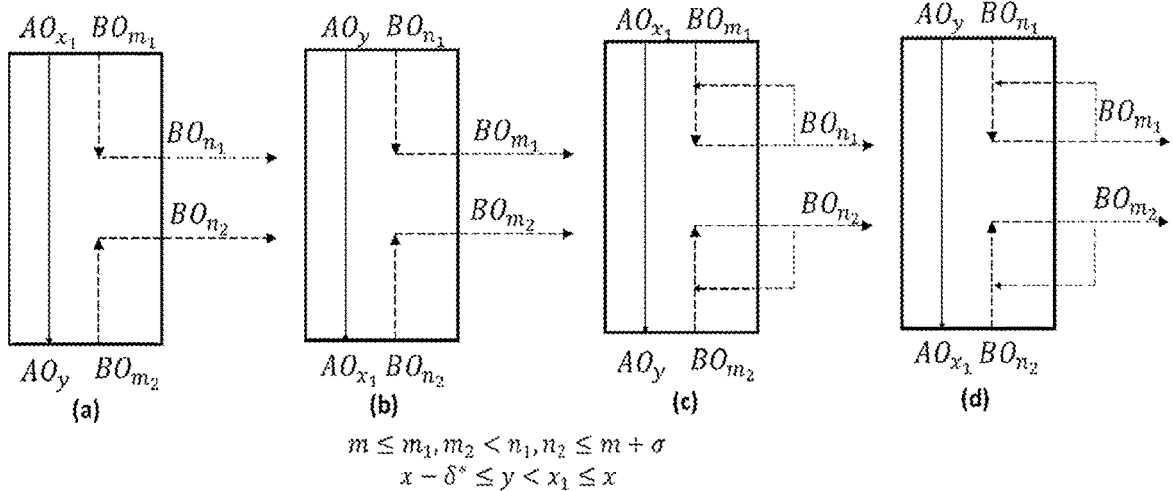
$$m \leq m_1, m_2 < n_1, n_2 \leq m + \sigma$$
$$x - \delta^s \leq y < x_1 \leq x$$
FIG. 10A      FIG. 10B      FIG. 10C      FIG. 10D

$$m \leq m_1 < n \leq m + \sigma$$
$$x - \delta^x \leq y_1, y_2 < x_1, x_2 \leq x$$

$$x - \delta^* \leq y < w < x_1, z \leq x$$
$$m \leq m_1 < k < n, l \leq m + \sigma$$

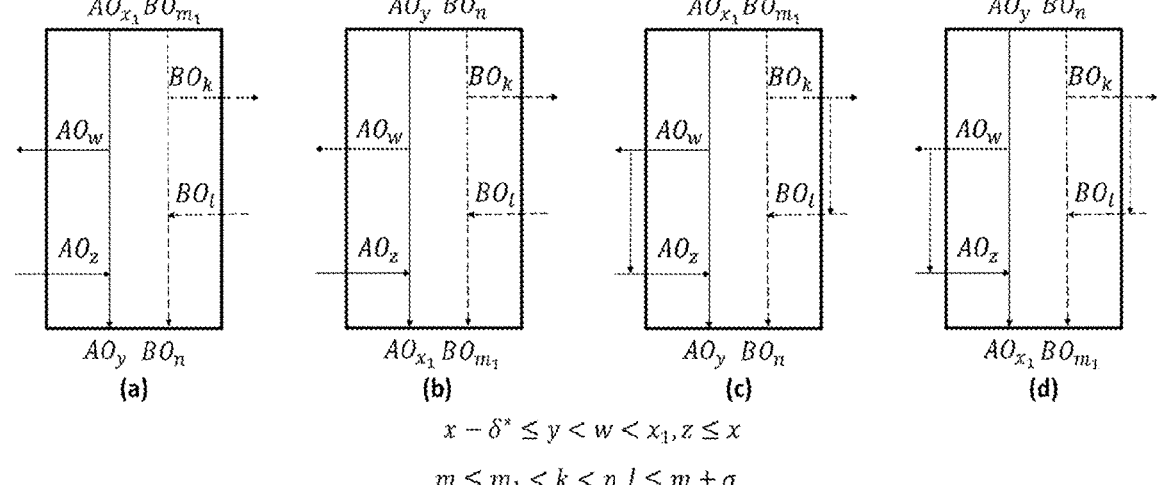
$$x - \delta^x \leq y < w < x_1, z \leq x$$
$$m \leq m_1 < k < n, l \leq m + \sigma$$
FIG. 13A      FIG. 13B      FIG. 13C      FIG. 13D

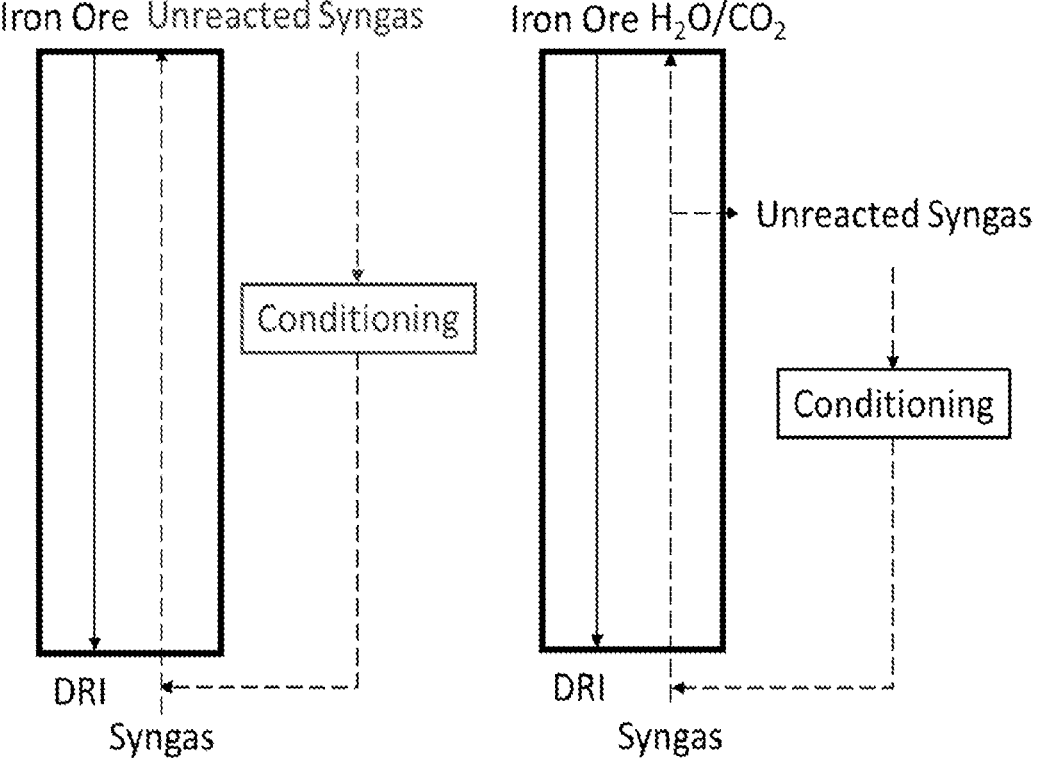
FIG. 14A          FIG. 14B

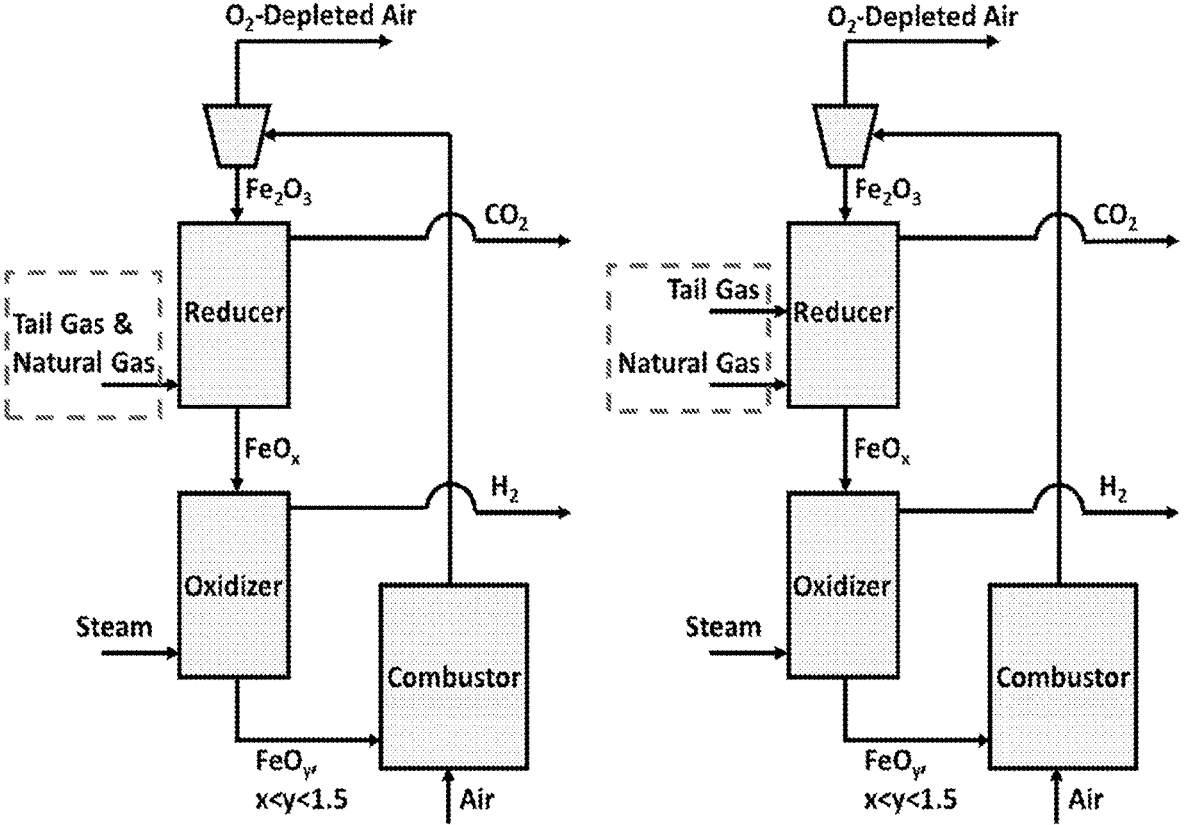
FIG. 15A　　　　　　　FIG. 15B

SYSTEMS AND METHODS FOR HIGH REACTANT CONVERSION THROUGH MULTIPLE REACTANT FLOW RATIO STAGING

CROSS-REFERENCE TO RELATED APPLICATION(S)

The present application is a U.S. national phase stage entry of International Patent Application No. PCT/US2021/039622, filed on Jun. 29, 2021, which claims priority to U.S. Provisional Patent Application No. 63/045,393, filed on Jun. 29, 2020, the entire contents of each of which are fully incorporated herein by reference.

FIELD

The present disclosure is related to reactor configurations for gas-solid reactions with multiple potential products to facilitate generation of one or more target products.

INTRODUCTION

There is a continuing need for improvement of the process efficiency and product yield in chemical industry. Gas-solid reactions, whether catalytic or not, are involved in numerous industrial chemical processes for the production of solid and/or gaseous products. Currently, for reactions with intermediate products (e.g., reduction/oxidation of metal oxides where the metal has more than two valence states), the conversion of feedstock as well as the yield of target product are restricted by thermodynamic equilibrium due to the presence of only one path for the gas and solid stream in the reactors.

SUMMARY

In one embodiment of the present disclosure, a reactor design for gas-solid reaction with one or more additional outlet for gas or solid phase is provided. In another embodiment, a reactor design for gas-solid reaction with one or more additional outlet for gas and solid phases is described. In yet another embodiment, the design for a gas-solid reactor with one side inlet and two outlets for gas phase is described. In one embodiment, a reactor design with pairs of inlet and outlet for both gas and solid phase is provided. In another embodiment, a reactor design with one or more side inlets but only one outlet for gas phase is provided. In yet another embodiment, a reactor design with two inlets at the top/bottom of reactor and two side outlets for gaseous phase is described. In yet another embodiment, a reactor design with one or more side inlets and outlets for both gas and solid phases is provided. In yet another embodiment, a modular reactor system with modules as individual reactor configurations in parallel and/or sequence is described.

The reactor configurations with staged inlets and outlets disclosed here uses side inlets and outlets on the reactor to affect conditions under thermodynamic equilibrium as well as the heat balance of reactor. In all the disclosed configurations, the reactor is designed and can be adjusted to convert gaseous and solid feedstocks to the desired product. The present disclosure details arrangements and designs for individual gas-solid reactor configurations, involving the relative flow direction of gas and solid phase, the transfer direction of O, side outlet product recycle, etc.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIGS. 2A and 2B show the phase diagram and operating lines (represented by the lighter colored lines) of the example gas-solid reactions within a counter-current reactor.

FIGS. 4A and 4B show phase diagrams and operating lines of certain configurations shown in FIGS. 3A and 3E, respectively.

FIGS. 5A-5H show configurations using one inlet and two or multiple outlets for both the gas and solid streams.

FIGS. 7A-7H show configurations using two inlet-and-outlet pairs for the gas phase and one inlet-and-outlet pair for the solid phase.

FIGS. 8A-8H show configurations using two inlet-and-outlet pairs for the solid phase and one inlet-and-outlet pair for the gas phase.

FIGS. 9A-9D show configurations with multiple gas inlets and one gas outlet.

FIGS. 10A-10D show configurations with a gas inlet from both the top and the bottom of the reactor and gas outlet from the side.

FIGS. 13A-13D show co-current reactor configurations with multiple side inlets and outlets for both gas and solid phases, considering the transfer direction of O and recycle of product from side outlet.

FIGS. 14A and 14B show a schematic layout of shaft furnace designs with and without a side outlet.

FIGS. 15A and 15B show flow diagrams of the chemical looping $H_2$ production system which utilizes the strategy of multiple gas phase inlets.

DETAILED DESCRIPTION

Figure 1:
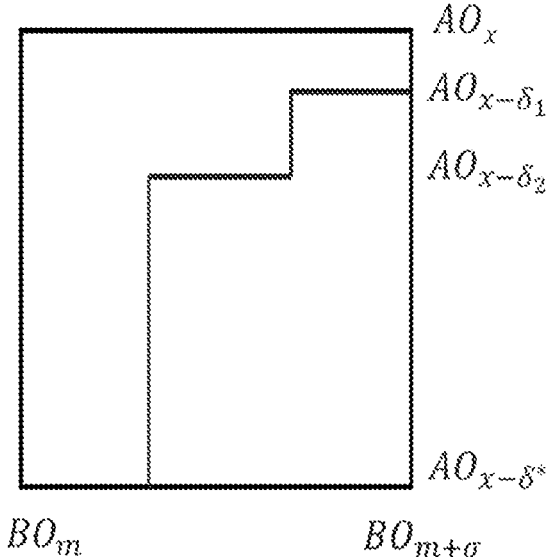
FIG. 1 shows the phase diagram of the gas-solid reaction example in this disclosure.

Generally, systems and methods disclosed herein relate to reactor design and operation strategies that can overcome inherent thermodynamic limits, which may improve product quality and/or reduce the number of operation units. Certain objectives of gas-solid reactors can be divided into two categories: one is aiming to achieve a certain product composition of the solid, and the other one is to obtain a specific composition in the gaseous effluent. In both cases, the maximum gas-solid conversions are inherently dictated by the thermodynamics. However, for reactions with intermediate products (e.g., reduction/oxidation of metal oxides where the metal has more than two valence states) that are carried out using conventional reactors with only one path for each phase, the equilibrium composition at the product outlets might not meet the requirement to be directly collected or to be further utilized in the downstream process. To illustrate the possible nonoptimal product composition collected at the outlets for reactions with intermediate products, a four-stage gas-solid reaction carried out in a moving-bed reactor is herein used as an example throughout this disclosure.

The instant disclosure provides various operating strategies that can overcome inherent thermodynamic limitations within gas-solid reactor systems. These operating strategies can involve the use of multiple locations of injection into and/or extraction from the gas-solid reactor to circumvent the conversion limits imposed by thermodynamic equilibrium. Exemplary operating strategies may result in higher quality, purity, and/or yield of the product, and/or lower energy consumption associated with purification, compression and recycling.

Exemplary approaches can be applied to various gas-solid reactor systems, such as shaft furnace ironmaking and chemical looping $H_2$ production, where the conversions of both the gas and solid outlets are desired to be high but are restricted by thermodynamic equilibrium. This approach can be utilized in such systems to achieve higher gas and/or solid conversions that are not achievable in a system with one gas outlet and one solid outlet (which may result in higher product yield, energy savings, and economic benefits).

I. Theoretical Background

Solid phases can include one or multiple metals and/or their compounds, which can include but are not limited to oxidizes, sulfides, halides, sulfates, carbonates, etc. Gas phases can include any organic or inorganic, combustible or non-combustible species, including but not limited to $H_2$, CO, $CH_4$, or a mixture thereof. The substance that is transferred between the gas and solid phases, represented by O, can be any element, including but not limited to oxygen, sulfur, nitrogen; or any compound, including but not limited to $CO_2$, $SO_2$. The gas-solid reaction can hence be redox or non-redox.

Note that in examples provided herein, compounds in the solid phases and gas phases are represented by $AO_x$ and $BO_x$ ($x \geq 0$), respectively. However, this notation is only for the convenience of discussion. Also note that in the following discussion, the words "top" and "bottom" do not necessarily carry any meaning about the spatial orientation of the reactor. "Top" and "bottom" are used to merely indicate the flow direction of the solid phase. "Top" signifies the location where the solid phase is injected into the reactor, while "bottom" signifies the location where the solid phase leaves the reactor. The use of the two words are only for the convenience of the discussion.

FIG. 1 presents the equilibrium phase diagram of an example gas-solid reaction where the gas and solid phases swing, respectively, from $BO_m$ to $BO_{m+o}$ and $AO_x$ to $AO_{x-\delta*}$. In addition, four different valence states of A can exist in the solid phase during the reaction, which results in the following four AO compounds: $AO_x$, $AO_{x-\delta_1}$, $AO_{x-\delta_2}$, and $AO_{x-\delta*}$.

The operating curves, which are derived from mass balance and are restricted by thermodynamic equilibrium, can be used to determine the gas and solids conversions.

FIG. 2A illustrates a process where a specific solid composition is targeted (i.e., $AO_{x-\delta_a}$), in which the operating line indicates that the collected gaseous product ($BO_n$) is in a mixture form of $BO_m$ and $BO_{m+o}$. This mixture gaseous product could dramatically reduce the overall process efficiency if a pure product stream ($BO_{m+o}$) is demanded, because of the requirement of adding capital-intensive air separation units and/or post-combustion units in the downstream. On the other hand, for a process that requires a pure gas product $BO_{m+o}$, the corresponding solid composition at the outlet is inherently fixed at $AO_{x-\delta b}$ as indicated in FIG. 2B.

If a higher conversion than $AO_{x-\delta_b}$ is targeted for the solid product, additional units are required to further convert the solid stream. In short, because the gas-to-solid ratio is the only adjustable parameter for such reactors under a given operating temperature and pressure, it is nearly, or completely, impossible to simultaneously achieve the gas and solid product compositions beyond what is dictated by the thermodynamic limitation. Hence, additional downstream units are required to further convert the products, thereby increasing the operating and capital cost of the process. FIG. 1 is a phase diagram of the exampled gas-solid reaction adopted in this disclosure. FIG. 2 is a phase diagram and operating lines (represented by the lighter lines) of the example gas-solid reaction within a counter-current reactor where in FIG. 2A the solid product composition is targeted at $AO_{x-a}$, and in FIG. 2B the gas product composition is targeted at $BO_{m+o}$.

II. Example Configurations and Operational Schemes

To overcome the inherent thermodynamic limit imposed on the conventional gas-solid reactors, multiple staged injections and/or extractions strategies are provided in this disclosure. Broadly characterized, various reactor configurations are contemplated herein, and include, but are not limited to: a reactor with one inlet for the gas phase, one inlet for the solid phase, and either one of the gas or solid phases with multiple outlets, and the other phase with one outlet; a reactor with one inlet for the gas phase, one inlet for the solid phase, and multiple outlets for both the gas and the solid phases; a reactor with one inlet and one outlet for the solid phase, and one inlet for the gas phase at the side, and two outlets for the gas phase at the top and the bottom of the reactor; a reactor with multiple inlets and multiple outlets for one phase (gas or solid), and one inlet and one outlet for the other phase; a reactor with one solid inlet, one solid outlet, multiple gas inlets and one gas outlet; a reactor with the injection of one phase (gas or solid) from both the top and the bottom of the reactor; and a reactor with multiple solid inlets, multiple solid outlets, multiple gas inlets, and multiple gas outlets.

The following embodiments illustrate how these strategies may improve the process efficiency/flexibility by using two or more stages of gaseous injections/extractions. FIG. 3 shows configurations of using one inlet for both the gas and solid phases with two or multiple outlets for one phase.

In one embodiment, as shown in FIGS. 3A-3D, adding one or more reactant outlets for the gas or solid phase in a counter-current reactor, while maintaining the unmanipulated phase as a single outlet, can result in the composition of the reactants exiting one of the added outlets to be fully converted while maintaining the target conversion of the unmanipulated phase. A similar approach can be applied to co-current reactors as shown in FIGS. 3E-3H, which enables multiple outlets of the manipulated phase to have different product compositions while maintaining the product composition of the unmanipulated phase unaffected, thereby increasing the process flexibility.

Figures 3A, 3B, 3C, 3D, 3E, 3F, 3G, 3H:
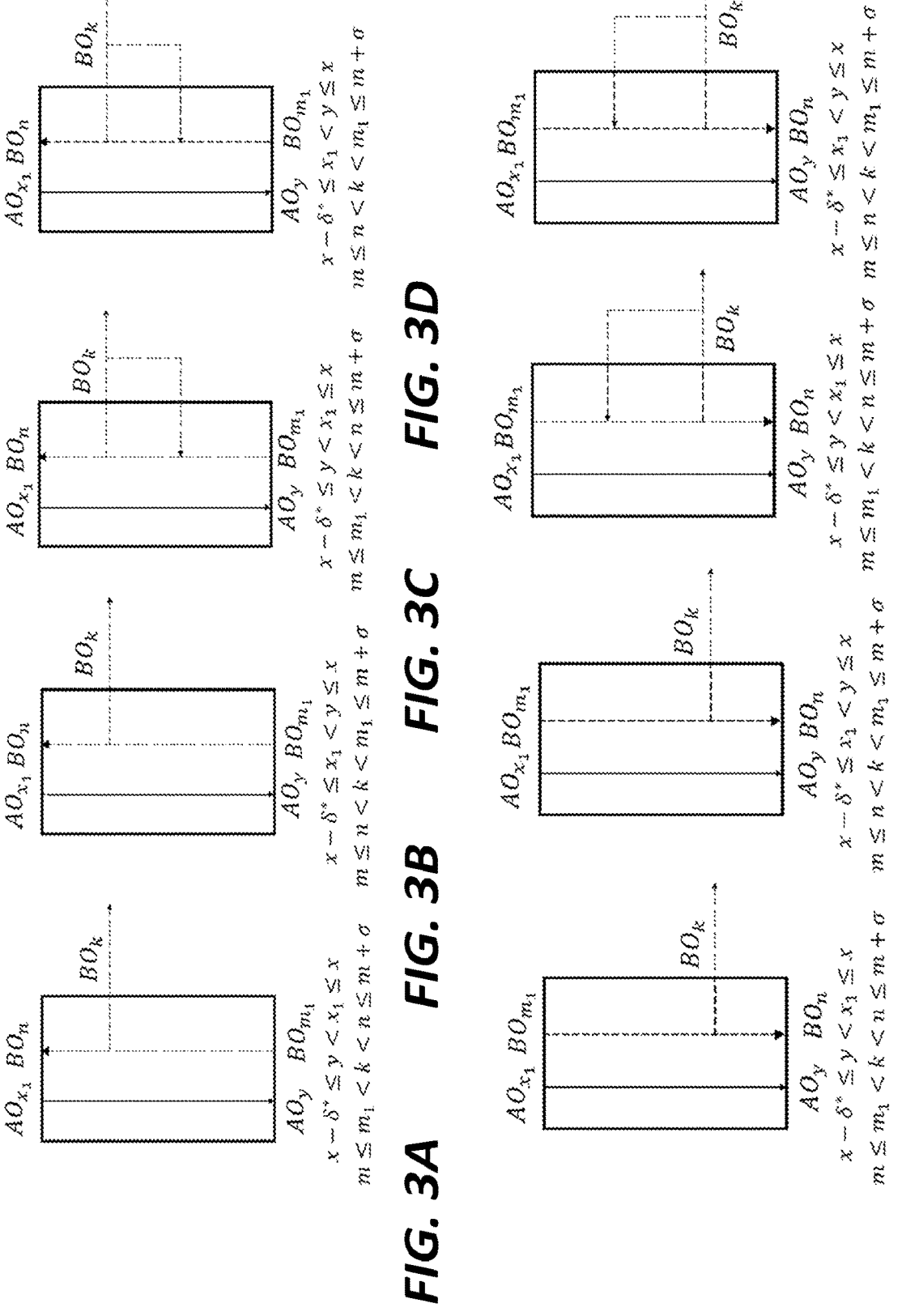
FIGS. 3A-3H show configurations using one inlet for both the gas and solid phases and two or multiple outlets for one of the gas or solid phases.

FIG. 4A schematically depicts a phase diagram for the counter-current reactor configuration of FIG. 3A. As seen, adding a side outlet creates two sections with different gas-to-solid ratios, which prevents the operating lines from intercepting the equilibrium lines. As a result, unlike the conventional reactor, where the gas composition is inherently fixed when a specific composition of the solid product is targeted as shown in FIG. 2A, an operating window for the top gas outlet (i.e., $k \leq n \leq m+\sigma$) can be obtained in this embodiment, including a fully converted gaseous product ($BO_{m+o}$).

The rationale of applying this embodiment to co-current reactors is similar to the counter-current case, which is illustrated in FIG. 4B by using the configuration of FIG. 3E as an example. As observed, the product composition of the side outlet can be varied depending on the location of the outlet port. The principles discussed in this embodiment can be extended to the following embodiments. Note that this embodiment holds whether O is transferred from solid to gas or vice versa, and the side outlet(s) can be further recycled/reused if necessary, as depicted in FIGS. 3C, 3D, 3G, and 3H.

An exemplary application is a shaft furnace reactor for the production of direct reduced iron (DRI) from iron ore and reducing gas, commonly syngas (CO and $H_2$). The shaft furnace is operated as a counter-current moving bed, corresponding to the configuration shown in FIG. 3A, where pelletized iron ore is moving downward while syngas flows upward. DRI is produced at the bottom of the furnace. In this case, O stands for oxygen atom, the reactant in solid phase is iron oxide, and the reactants in gas phase are CO and $H_2$. The unreacted syngas coming out from the top of the furnace requires conditioning equipment, including mainly compression and $CO_2$ removal, to be recycled as the reducing gas of the shaft furnace or combusted to provide heat. The configuration shown in FIG. 3A can be adopted to allow one or more side outlet for the unreacted syngas. The solid to gas ratio beyond the side outlet will be higher than that below the side outlet, resulting in production of $CO_2$ and $H_2O$ from full combustion of syngas. In addition, the amount of gas from the side gas outlet is less than that of gas coming out from the top of shaft furnace before the adoption of this disclosure, which reduces the size of conditioning equipment and the energy consumption of compression. Thus, the cost and energy consumption associated with $CO_2$ removal may be lower for the design with two gas outlets compared to one gas outlet.

Other configurations may include reactors with side outlets for both the solid and gas streams. As shown in FIG. 5, these embodiments can be applied to reactors with counter-current or co-current gas-solid contact patterns. In addition, these embodiments hold when O is transferred from the gas phase to the solid phase or vice versa, and the effluent of the side outlets can be recycled/reused if necessary. In an extension of this embodiment, the multiple outlets can be achieved through a multi-stage moving bed reactor is connected in series where multiple outlets for the gas and/or solids can be placed between each stage. FIG. 5 shows configurations of using one inlet and two or multiple outlets for both the gas and solid streams.

Figure 6A:
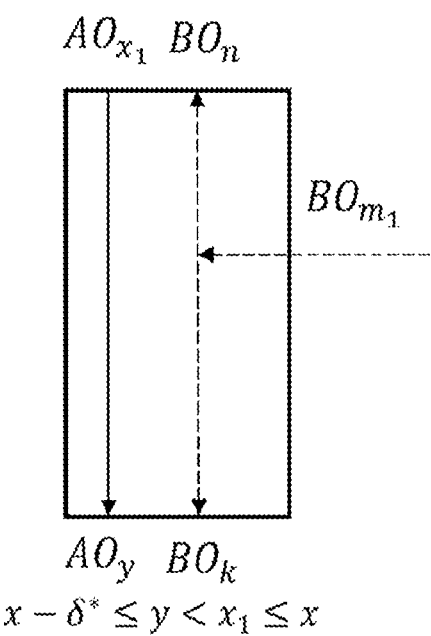
FIGS. 6A-6D show configurations using one side inlet and two outlets at the two ends of the reactor for the gas phase.
Figure 6B:
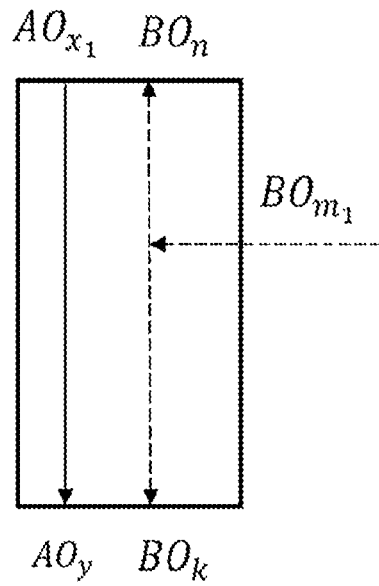
Figure 6C:
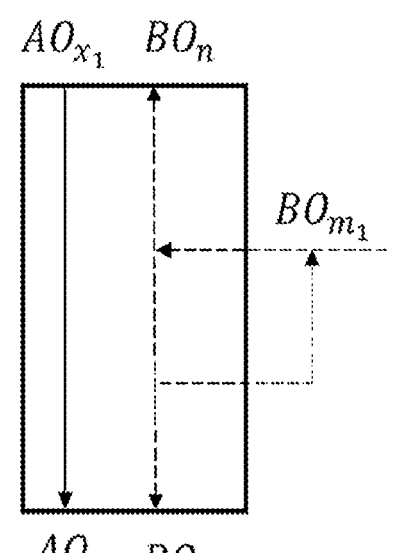
Figure 6D:
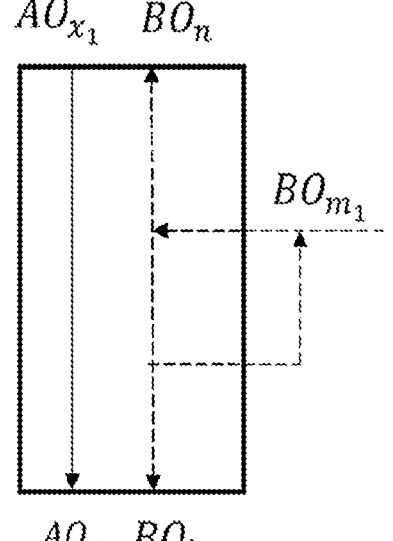

FIGS. 6A-6D show configurations of using one side inlet, one top and bottom outlets for the gas phase. As shown in FIGS. 6A-6D, the gas inlet is introduced to the side of the reactor, resulting the gas stream split into two outlets respectively at the top and the bottom of the reactor as exemplified in FIGS. 6A and 6B. Through this configuration, counter-current and a co-current gas-solid contacts can be created at different sections within the reactor. Thus, the gas product composition of the counter-current section can be varied, including a fully converted gaseous product ($BO_{m+o}$). This embodiment holds whether O is transferred from the solid to the gas phase or vice versa. If necessary, the gaseous effluent of the co-current contact section, which is a mixture of $BO_m$ and $BO_{m+o}$, can be further recycled/reused as shown in FIGS. 6C and 6D.

In other embodiments, two inlet-and-outlet pairs are designed for one phase while the other phase remains with one inlet-and-outlet pair. FIGS. 7A-7H show configurations of using two inlet-and-outlet pairs for the gas phase and one inlet-and-outlet pair for the solid phase. FIGS. 8A-8H show configurations of using two inlet-and-outlet pairs for the solid phase and one inlet-and-outlet pair for the gas phase. For the phase with two inlet-and-outlet pairs, the inlet and outlet of one pair are located respectively at one end and side of the reactor, whereas the other pair has the opposite order. Through this design, a counter-current and a co-current gas-solid contacts can be created at different sections within a counter-current reactor, while two co-current sections with different gas-to-solid ratio can be obtained in a co-current reactor. These configurations hold whether O is transferred from the solid to the gas phase or vice versa. If necessary, the outlet streams of the phase with two pairs of inlet and outlet can be further recycled/reused.

FIGS. 9A-9D show four exemplary arrangements of the gas and solid flow of the system where the reactor is operated with a solid inlet and a gas inlet, which flow in either a counter-current or co-current pattern. The solid inlet stream is injected from the top of the reactor and leaves the reactor at the bottom. The gas inlet is injected from the bottom of the bed in the counter-current operating mode and is injected from the top of the bed in the co-current operating mode. An additional gas stream or multiple gas streams are injected from the side of the reactor. FIG. 9A shows the configuration where the solid and gas react in a counter-current contact pattern where O is transferred from the solid to the gas. FIG. 9B shows another configuration with counter-current gas-solid flow pattern where O is transferred from the gas to the solid. FIGS. 9C and 9D show the configurations where the solid and gas flow in a co-current contact pattern. In FIG. 9C, O is transferred from the solid to the gas. In FIG. 9D, O is transferred from the gas to the solid.

A specific application of embodiments shown in FIGS. 9A-9D is in the reducer operation of chemical looping $H_2$ production. The reducer of the chemical looping $H_2$ production process corresponds to FIG. 9A, which operates under a counter-current gas-solid contact pattern, where the solid is reduced and the gas is oxidized. In this specific case, O stands for oxygen atoms. An objective of the reducer of the chemical looping $H_2$ production process is to fully oxidize one or multiple reducing gas streams into $CO_2$ and $H_2O$, while reducing the metal oxide to an oxidation degree sufficiently low in order to facilitate the subsequent water splitting reaction in the oxidizer. When more than one gas streams of different compositions are used as the reactants, multiple stages of reactant gas injection along the height of the reactor can provide greater efficiency benefit than from one point at the bottom of the reactor. The design shown in FIG. 9A can be adopted to let one or several gas streams to be injected from the side of the reducer. The gas streams injected from the side are usually those with lower reducing potential. This configuration can result in a degree of solid reduction at the reducer bottom solid outlet that is higher than the case when all the gas streams are injected from the bottom of the reducer, while fully oxidizing the gaseous reactants into $H_2O$ and $CO_2$.

FIGS. 10A-10D show configurations of gas inlets being provided from both the top and the bottom, with multiple side outlets. In FIG. 10A-10D, either the gas or the solid inlet is injected from both the top and the bottom of the reactor. FIGS. 10A-10D show the system design where the solid enters the reactor from the top and leaves the reactor from the bottom, while the gas is injected from both the top and the bottom of the reactor. FIG. 10A shows a configuration where O is transferred from the solid to the gas. FIG. 10B shows a configuration where O is transferred from the gas to the solid. The systems shown in FIGS. 10C and 10D are constructed by applying gas recycle to the configurations shown in FIGS. 10A and 10B, respectively. Although FIGS. 10C and 10D show the system configurations where both gas outlets are recycled, in practical operation it is possible to only recycle one of the two gas outlet streams.

Figures 11A, 11B, 11C, 11D:
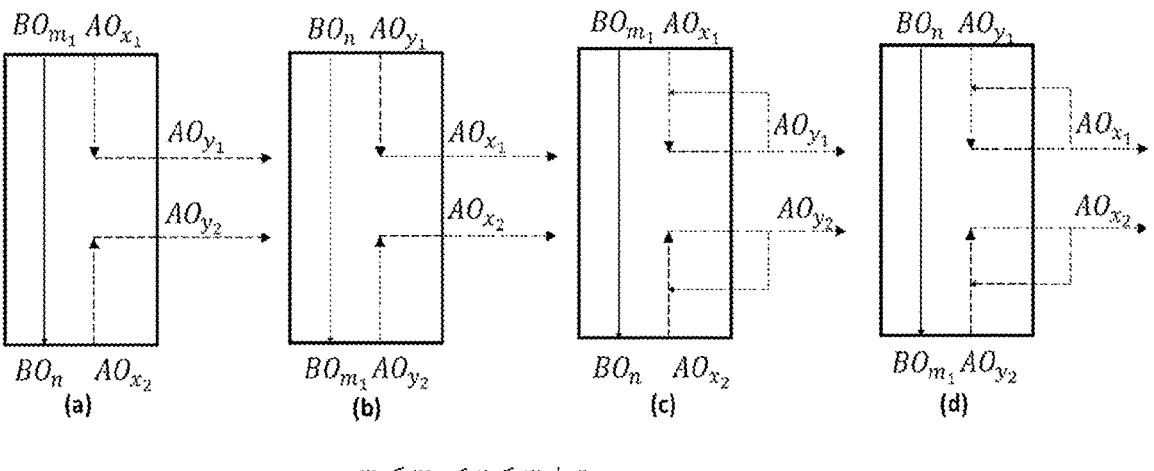
FIGS. 11A-11D show configurations with a solid inlet from both the top and the bottom and outlet from the side.

FIGS. 11A-11D show configurations where solids are injected both from the top and the bottom of the reactor, while the gas is injected from the top and flows downward. FIG. 11A shows a configuration where the gas stream, which is injected from the top of the reactor, receives O transferred from the solid. FIG. 11B shows the system design where O is transferred from the gas to the solid. FIGS. 11C and 11D are constructed by applying solid recycle to the configurations shown in FIGS. 11A and 11B, respectively. Although FIGS. 11C and 11D show system configurations where both solid outlets are recycled, in practical operation it is possible to only recycle one of the two solid outlet streams.

Figures 12A, 12B, 12C, 12D:
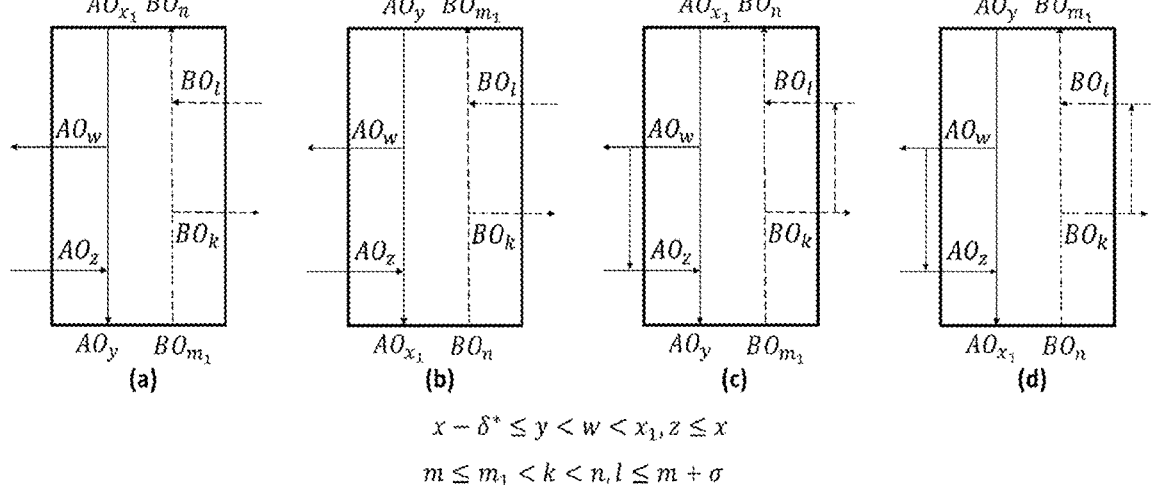
FIGS. 12A-12D show counter-current reactor configurations with multiple side inlets and outlets for both gas and solid phases, considering the transfer direction of O and recycle of product from side outlet.

FIGS. 12A-12D show configurations of one side inlet and one side outlet for both gas and solid phases in a counter-current reactor. An example shown in FIG. 12A includes one side inlet and one side outlet are included for both gas and solid phases in a counter-current reactor. It is noted that O is transferred from solid to gas in FIG. 12A and can be transferred from gas to solid as shown in FIG. 12B. The side inlets and outlets enable the operation to make use of multiple valence states of the solid material and to facilitate the production of one or more target product from the reactor. Summarized in FIGS. 12C and 12D, the product from the side outlets ($AO_w$ and $BO_k$) can be recycled back to the reactor with or without treatment, which affects the composition of stream for side inlet as well as the heat balance of the reactor. In addition, the layouts of FIGS. 12C and 12D are valid if only one of the side outlet products ($AO_w$ and $BO_k$) is recycled.

FIGS. 13A-13D show configurations of one side inlet and one side outlet for both gas and solid phases in a co-current reactor. As shown in FIG. 13A, one or more inlets and outlets for both gas and solid phases can be included in a co-current reactor. O is transferred from solid to gas in FIG. 13A and can be transferred from gas to solid as shown in FIG. 13B. In some instances, part or all of side outlet products $AO_w$ and $BO_k$ can be recycled to the reactor with or without treatment as shown in FIGS. 13C and 13D. Configurations shown in FIGS. 13C and 13D may result in additional flexibility for heat balance of the reactor and the quality of target product. It is noted that the recycle of side outlet product can be $AO_w$ and/or $BO_k$.

In all embodiments, multiple modules can be arranged in parallel and/or sequence to form a modular reactor system. The modules are chosen from all the reactor configurations above, thus improving the flexibility and quality of product compared to individual reactor.

III. Example Methods of Operation

Various methods may be employed to operate the various reactor system configurations disclosed and contemplated herein.

An exemplary method may include providing, in a first flow direction, metal particles to a solids inlet of the reactor. The metal particles have at least two oxidation states and enter the solids inlet at a first oxidation state. In some instances, the metal particles comprise iron ore, and other contemplated materials are discussed in greater detail elsewhere in this disclosure.

The example method may also include providing, in a second flow direction, an inlet gas stream to a first gas inlet of the reactor such that the first flow direction and the second flow direction are counter current. In some instances, the inlet gas stream comprises carbon monoxide (CO) and hydrogen ($H_2$).

The method also includes providing a first gas outlet stream via a first gas outlet arranged near a top of the reactor. The first gas outlet may be positioned such that the first gas outlet stream comprises a minimum amount of carbon in the form of carbon dioxide ($CO_2$). For instance, 85-98%; 88-96%; 90-98%; 90-95%; or 95-98% of carbon in the first gas outlet stream may be in the form of carbon dioxide ($CO_2$). In various implementations, at least 85%; at least 88%; at least 90%; at least 92%; at least 95%; or at least 98% of carbon in the first gas outlet stream may be in the form of carbon dioxide ($CO_2$). In various implementations, no more than 99%; no more than 98%; no more than 96%; no more than 95%; no more than 90%; or no more than 85% of carbon in the first gas outlet stream may be in the form of carbon dioxide ($CO_2$).

The method may also include providing a second gas outlet stream via a second gas outlet positioned below the first gas outlet. In some instances, the second gas outlet stream may be recycled and provided back to the reactor. For countercurrent flow configurations, the recycle stream may be provided at a position lower than the second gas outlet. For co-current flow configurations, the recycle stream may be provided at a position higher than the second gas outlet.

Various extraction ratios may be used to draw off the second gas outlet stream, where the extraction ratio is a percentage of the gas stream exiting the second gas outlet. Extraction ratios may depend on an amount of oxygen ($O_2$) in the gas stream. For instance, an extraction ratio for the second gas outlet stream may be 60%-75%; 62%-72%; 60%-65%; or 70%-75%. In various implementations, an extraction ratio for the second gas outlet stream may be at least 60%; at least 62%; at least 65%; at least 67%; at least 70%; at least 72%; or at least 74%. In various implementations, an extraction ratio for the second gas outlet stream may be no more than 75%; no more than 73%; no more than 70%; no more than 68%; no more than 64%; or no more than 62%.

The example method may include discharging metal particles via a solids outlet positioned proximate a bottom portion of the reactor. The discharged metal particles are at a second oxidation state that is different from the first oxidation state. Additionally, the metal particles comprise less oxygen at the solids outlet than directly below the second gas outlet.

In some instances, the example method may include discharging metal particles via a second solids outlet. The second solids outlet may be positioned at a side of the reactor and above the bottom of the reactor. Metal particles discharged at the solids outlet (proximate the bottom of the reactor) comprise less oxygen than the metal particles discharged at the second solids outlet higher in the reactor. In countercurrent configurations, the second solids outlet may be positioned relatively higher in the reactor than the second gas outlet. In co-current configurations, the second solids outlet may be positioned relatively lower in the reactor than the second gas outlet.

In some instances, the example method may include providing the inlet gas stream at a side of the reactor such that a portion of the inlet gas flows counter-currently to the metal particles and a remaining portion of the inlet gas flows co-currently with the metal particles. In those implementations, the method may comprise providing a first gas outlet stream at a top of the reactor and providing a second gas outlet stream at a bottom of the reactor.

Another exemplary method may include providing, in a first flow direction, metal particles to a solids inlet of the reactor. The metal particles have at least two oxidation states and enter the solids inlet at a first oxidation state. In some instances, the metal particles comprise iron oxide particles.

The example method may also include providing, in a second flow direction, a first inlet gas stream to a first gas inlet and a second inlet gas stream to a second gas inlet of the reactor. The first inlet gas stream and the second inlet gas stream may be provided such that the first flow direction and the second flow direction are counter current. The second gas inlet may be provided closer to a top of the reactor than the first gas inlet.

In some instances, each of the first inlet gas stream and the second inlet gas stream comprise carbon dioxide ($CO_2$), carbon monoxide (CO), hydrogen ($H_2$), or combinations thereof. In some instances, the first inlet gas stream and the second inlet gas may have different compositions. For example, the first inlet gas stream may have a composition with a reducing potential that is greater than a reducing potential of a composition provided to the second inlet gas stream.

The method also includes providing a first gas outlet stream via a first gas outlet arranged near a top of the reactor. The first gas outlet may be positioned such that the first gas outlet stream comprises a minimum amount of carbon in the form of carbon dioxide ($CO_2$). For instance, 85-98%; 88-96%; 90-98%; 90-95%; or 95-98% of carbon in the first gas outlet stream may be in the form of carbon dioxide ($CO_2$). In various implementations, at least 85%; at least 88%; at least 90%; at least 92%; at least 95%; or at least 98% of carbon in the first gas outlet stream may be in the form of carbon dioxide ($CO_2$). In various implementations, no more than 99%; no more than 98%; no more than 96%; no more than 95%; no more than 90%; or no more than 85% of carbon in the first gas outlet stream may be in the form of carbon dioxide ($CO_2$).

In some instances, the method may also include providing a second gas outlet stream via a second gas outlet positioned below the first gas outlet. In some instances, the second gas outlet stream may be recycled and provided back to the reactor. For countercurrent flow configurations, the recycle stream may be provided at a position lower than the second gas outlet. For co-current flow configurations, the recycle stream may be provided at a position higher than the second gas outlet.

Various extraction ratios may be used to draw off the second gas outlet stream, where the extraction ratio is a percentage of the gas stream exiting the second gas outlet. Extraction ratios may depend on an amount of oxygen ($O_2$) in the gas stream. For instance, an extraction ratio for the second gas outlet stream may be 60%-75%; 62%-72%; 60%-65%; or 70%-75%. In various implementations, an extraction ratio for the second gas outlet stream may be at least 60%; at least 62%; at least 65%; at least 67%; at least 70%; at least 72%; or at least 74%. In various implementations, an extraction ratio for the second gas outlet stream may be no more than 75%; no more than 73%; no more than 70%; no more than 68%; no more than 64%; or no more than 62%.

The example method may include discharging metal particles via a solids outlet positioned proximate a bottom portion of the reactor. The discharged metal particles are at a second oxidation state that is different from the first oxidation state. Additionally, the metal particles comprise less oxygen at the solids outlet than directly below the second gas outlet.

In some instances, the example method may include discharging metal oxide particles from a second solids outlet. The second solids outlet may be arranged at a side of the reactor and above the bottom of the reactor.

IV. Experimental Examples

Two experimental cases are studied as examples to quantitatively show the benefit of reactor configurations in this disclosure. One case is on pyrometallurgy and the other one is on hydrogen production. The thermodynamic calculation results of the cases are obtained using Aspen Plus and shown below.

A. Pyrometallurgy

One case considers the production of direct reduced iron (DRI) from iron ore and reducing gas, which is usually syngas, in a shaft furnace. Table 1 shows the composition of iron ore and syngas used in calculation (reference ORNL/TM-2005). FIGS. 14A and 14B show a shaft furnace for DRI production: FIG. 14A shows one gas outlet and FIG. 14B shows two gas outlets. As is shown in FIG. 14A, the shaft furnace is operated as a counter-current moving bed, where pelletized iron ore is moving downward and syngas is flowing upward. DRI is produced at the bottom of the furnace. The unreacted syngas coming out from the top of the furnace requires conditioning equipment, including mainly compression and $CO_2$ removal, to be recycled as the reducing gas of the shaft furnace or combusted to provide heat.

For the design of shaft furnace, application of this disclosure will reduce the cost and energy required for the conditioning equipment. FIG. 14B shows the shaft furnace with two gas outlets. From the side gas outlet, the amount of gas is less than that of gas coming out from the top of shaft furnace in FIG. 14A, which reduces the size of conditioning equipment and the energy consumption of compression. Besides, part of the $CO_2$ is inherently removed by the configuration with two gas outlets and coming out from the top gas outlet. Thus, the cost and energy consumption associated with $CO_2$ removal is lower for the configuration with two gas outlets compared to one gas outlet.

TABLE 1

| Composition of iron ore and syngas (in weight percentage) | | | |
|---|---|---|---|
| | Syngas | | Iron Ore |
| $CH_4$ | 8.8 | $Fe_2O_3$ | 82 |
| CO | 64.1 | $Fe_3O_4$ | 12 |
| $CO_2$ | 12.7 | $SiO_2$ | 6 |
| $H_2$ | 5.7 | | |
| $H_2O$ | 8.2 | | |
| $N_2$ | 0.5 | | |

Based on the composition given in Table 1, production of 1 kg DRI needs 0.73 kg syngas for both configurations shown in FIGS. 14A and 14B. Table 2 summarizes the composition of gas coming out from shaft furnace. The volume of product from side gas outlet in two gas outlets configuration is 85% of the top gas output in one gas outlet configuration, which results in a 15% saving of energy consumption as well as the equipment size for compression. Calculation also shows that the two gas outlets configuration reduces 33% energy consumption for CO2 removal compared to the one gas outlet configuration.

TABLE 2

| Gas outlet composition for the production of 1 kg DRI (Unit: kg) | | | |
|---|---|---|---|
| | One Gas Outlets | Two Gas Outlets | |
| | Top | Top | Side |
| $CH_4$ | 0.000 | 0.000 | 0.000 |
| CO | 0.359 | 0.000 | 0.354 |
| $CO_2$ | 0.431 | 0.149 | 0.290 |
| $H_2$ | 0.032 | 0.000 | 0.032 |
| $H_2O$ | 0.286 | 0.086 | 0.197 |
| $N_2$ | 0.004 | 0.001 | 0.003 |

B. Hydrogen Production

The advantage of the staged-injection configuration is quantified by another case study, which is concerned about the H2 production from a chemical looping system. This case study considers the production of H2 using two gas streams as the feedstock in a chemical looping system. These two gas streams include a stream of natural gas and a stream of low-quality tail gas. The compositions of the two streams are shown in Table 3.

TABLE 3

| Composition (shown in molar fraction) of gas streams used in the case study | | |
|---|---|---|
| | Natural Gas | Tail Gas |
| $CH_4$ | 0.931 | 0 |
| $C_2H_6$ | 0.032 | 0 |
| $C_3H_8$ | 0.007 | 0 |
| $C_4H_{10}$ | 0.004 | 0 |
| $CH_3OH$ | 0 | 0 |
| $CO_2$ | 0.01 | 0.62 |
| CO | 0 | 0.19 |
| $H_2$ | 0 | 0.19 |
| $N_2$ | 0.016 | 0 |

As indicated by the compositions in Table 3, natural gas is a strongly reducing gas mixture because it mainly contains hydrocarbons and has minimal amount of CO2. On the other hand, the tail gas stream is much less reducing because it contains high concentration of CO2. Based on thermodynamic rationale, utilizing the two gases in the staged injection system is expected to show added benefits compared to injecting the two gases from the same port. Two cases have been simulated in ASPEN Plus v11, including one case of single port injection and one case of staged injection, to quantify the additional benefits of the staged injection strategy. The flow diagrams of the two cases are shown in FIGS. 15A and 15B. This operating strategy corresponds to the system configuration shown in FIG. 10A. FIGS. 15A and 15B show flow diagrams of a single port injection case (FIG. 15A) and a staged injection case (FIG. 15B).

As shown in FIG. 15A, for the single port injection case, natural gas and tail gas are both injected from the bottom of the reducer. Whereas for the staged injection case, natural gas is injected from the bottom of the reducer while tail gas is injected from the side of the reducer.

The performance of the two cases is summarized in Table 4. The molar flows of feedstock and products of this study are normalized based on 1 kmol/hr natural gas injection into the reducer.

TABLE 4

| Plant performance of the single port injection and staged injection cases | | |
|---|---|---|
| | Single Port Injection | Staged Injection |
| Input Conditions | | |
| Tail Gas Inlet, kmol/hr | 6.9 | 6.9 |
| Natural Gas Inlet, kmol/hr | 1 | 1 |
| Oxidizer Steam Inlet, kmol/hr | 14.6 | 9.2 |
| Solid Circulation Rate, kg/hr | 3468 | 2603 |
| Output Conditions | | |
| Reducer Bottom Solid Conversion*, % | 34.1 | 45.4 |
| $H_2$ Output, kmol/hr | 3.52 | 4.09 |

$$* \text{Solid Conversion} = \frac{\text{lattice oxygen removed from the particles}}{\text{total available lattice oxygen from the particles}} = 1 - \frac{[O]/[Fe]}{1.5}$$

As shown in Table 4, both systems operate with a tail gas/natural gas feedstock molar ratio of 6.9. The operating conditions of both systems are adjusted to maximize $H_2$ yield while maintaining the solid temperature balance of the chemical looping system. The comparison between the two cases indicate that the staged injection option has significant advantages compared to the single port injection option in multiple aspects, including higher H2 yield, less steam consumption, and lower solid circulation rate. The staged injection case is able to generate 16.4% more H2 than the single port injection case using the same feedstock. In addition, the steam consumption of the staged injection case is 36.8% lower than the single stage injection case. Moreover, the solid circulation rate of the staged injection case is 24.9% lower than the single stage system, which leads to significant reduction in reactor size.

A reason for the various benefits of the staged injection case is the change in thermodynamics inside the reducer induced by the change in the locations of feedstock injection. By injecting the more reducing natural gas separately from the bottom while injecting the less reducing tail gas from the side, the metal oxide particles are exposed to a more reducing environment at the bottom of the reducer compared to the single port injection mode. The more reducing environment at the reducer bottom enables the reduction of particles into a lower oxidation state, as indicated by the comparison between the solid conversion of the two cases. While the single port injection case can reduce the particles to a maximum solid conversion of 34.1%, the staged injection case can reduce the particles to a maximum solid conversion of 45.4%. Higher solid conversion means that more $H_2$ can be produced from the oxidizer using less steam, as previously indicated in Table 4.

C. Reduction of Iron Ore Experiments

Figure 16A:
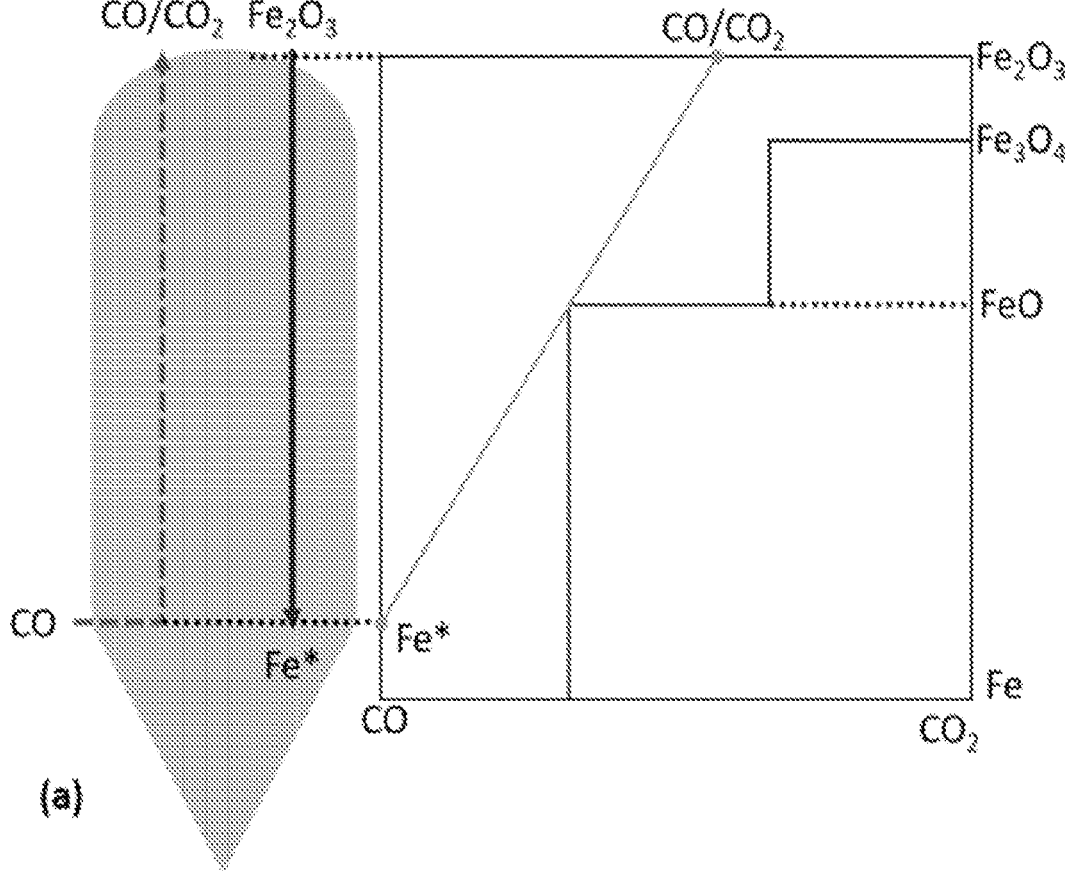
FIG. 16A is a schematic illustration of gas-solid contact for a conventional shaft furnace design.

Experiments were performed that evaluated the reduction of iron ore by selectively varying the reducing-gas-to-iron-ore flow ratio. The location of the gas inlets and outlets are placed on the shaft reactor to thermodynamically optimize the reduction of iron ore and the conversion of the reducing gas to $CO_2$. The equilibrium phase diagram and operating line for a conventional shaft furnace under isothermal conditions are illustrated in FIG. 16A using CO as the example of reducing agent. Similar to a Rist diagram used for blast furnace design, the operating line is derived from mass balance and is restricted by thermodynamic equilibrium constraints and can be used to determine the maximum gas and solids conversions attainable based on the desired product.

Figure 16B:
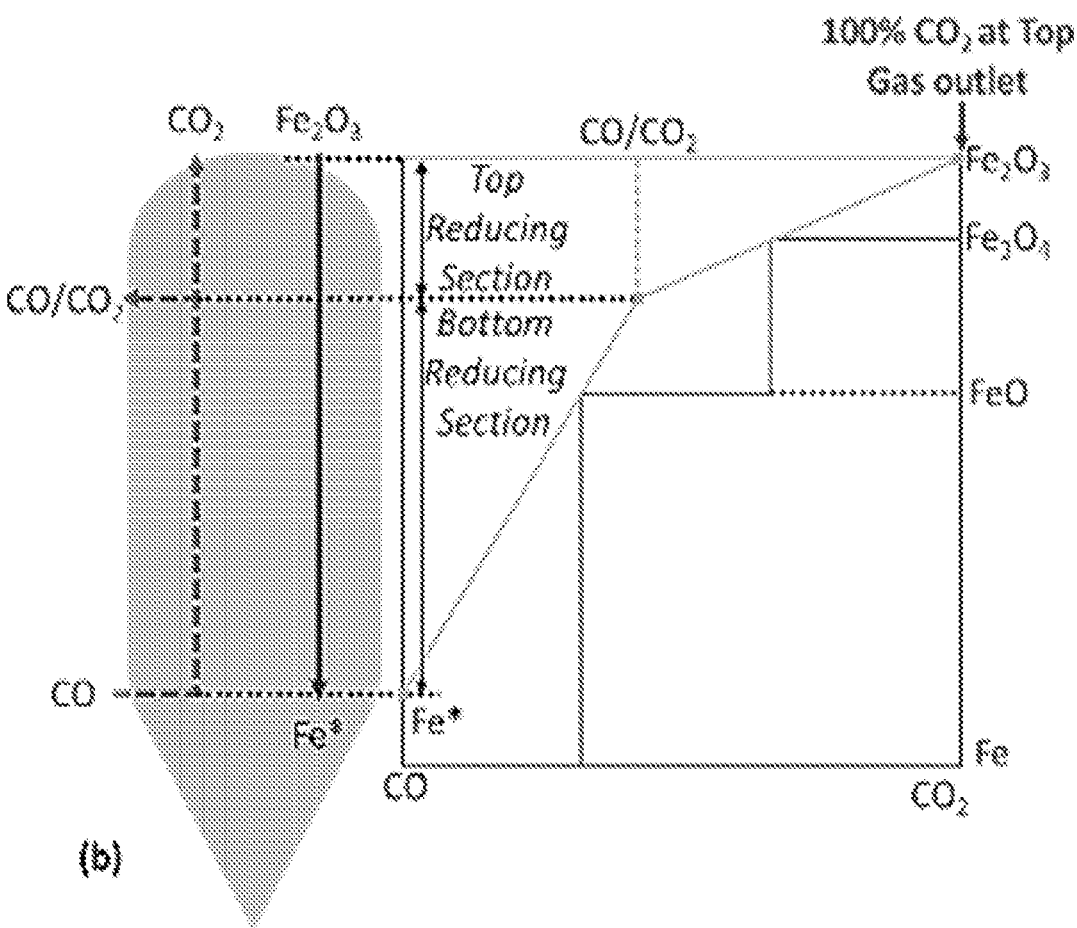
FIG. 16B is a schematic illustration of gas-solid contact for an exemplary shaft furnace design consistent with certain embodiments of the disclosure.

In the case of a single gas outlet, to reach a desired metallic iron content (Fe*), a high CO content ratio product gas from the shaft furnace will be produced. Incorporating a secondary gas outlet side extraction from the shaft furnace changes the reducing gas and iron flow ratio, and, by adjusting the amount of gas extracted from each outlet, a fully oxidized gas stream including predominantly $CO_2$ and $H_2O$ can be extracted from the top section of the reactor, as indicated in FIG. 16B.

The reduction of iron oxides with CO in a counter-current moving-bed reactor was simulated and validated experimentally. In the bench scale reactor experiment, iron titanate ($Fe_2TiO_5$) was reduced by CO under varying side port extraction flow rates. As shown in Table 5 below, the CO conversion at the top of the reactor increased significantly as the side extraction ratio, defined as the ratio between the side extraction flow rate and the total gas flow rate in the bottom section of the reactor, increased.

TABLE 5

The comparison of simulation and experimental results of gas outlet composition for various side port gasextraction fraction of MSF

| | Side extraction ratio | | | |
| Outlet Gas | 62% | | 72% | |
| Concentration | Experiment | Simulation | Experiment | Simulation |
| $CO_2$ (%) | 95 | 96 | 98 | 100 |
| CO (%) | 5 | 4 | 2 | 0 |

The reducing gas was almost fully oxidized to $CO_2$ as the side extraction ratio reaches 72%. The results are consistent with the prediction of ASPEN process simulation. This experiment demonstrated that the full oxidation of reducing gas in the reactor can be achieved via manipulating the side extraction, and that the ASPEN process model can be used to predict the performance of the reactor. Note, without the side extraction, the CO concentration in the gas outlet will reach up to 44%, requiring a $CO_2$ separation device to purify the stream. The incomplete iron conversion (63%) was only due to the limitations of the existing flowmeters on the existing moving bed bench unit. As the simulations match well with the experimental results, the testing proves the side extraction design allows for $CO_2$ capture from the moving bed shaft furnace will produce reduced iron.

V. Embodiments

Embodiments of the present disclosure are disclosed in the following clauses:

Clause 1. A method for operating a reactor having a top and a bottom, the method comprising:

providing, in a first flow direction, metal particles to a solids inlet of the reactor, wherein the metal particles have at least two oxidation states; and wherein the metal particles enter the solids inlet at a first oxidation state;

providing, in a second flow direction, an inlet gas stream to a gas inlet of the reactor, such that the first flow direction and the second flow direction are counter-current;

providing a first gas outlet stream via a first gas outlet arranged proximate a top of the reactor, wherein at least 85% of carbon species in the first gas outlet stream is in the form of carbon dioxide ($CO_2$);

providing a second gas outlet stream via a second gas outlet positioned below the first gas outlet; and discharging metal particles via a solids outlet positioned proximate a bottom portion of the reactor, the metal particles being at a second oxidation state that is different from the first oxidation state, wherein the metal particles comprise less oxygen at the solids outlet than directly below the second gas outlet.

Clause 2. The method according to clause 1, further comprising recycling the second gas outlet stream at a position in the reactor that is relatively higher than the second gas outlet.

Clause 3. The method according to clause 1 or clause 2, further comprising:

discharging metal particles via a second solids outlet arranged at a side of the reactor and above the bottom of the reactor, wherein the metal particles discharged at the solids outlet comprise less oxygen than the metal particles discharged at the second solids outlet.

Clause 4. The method according to any one of clauses 1-3, the metal particles being discharged through the second solids outlet at a position that is relatively higher in the reactor than the second gas outlet.

Clause 5. The method according to clause 4, further comprising recycling the metal particles discharged through the second solids outlet back through a second solids inlet positioned lower in the reactor than the second solids outlet.

Clause 6. The method according to any one of clauses 1-5, further comprising providing the inlet gas stream in the first flow direction such that a portion of the inlet gas stream flows co-currently with the metal particles.

Clause 7. The method according to clause 6, wherein the gas inlet of the reactor is positioned at a side of the reactor positioned below the top of the reactor.

Clause 8. The method according to any one of clauses 1-7, wherein the gas inlet of the reactor is positioned at the bottom of the reactor.

Clause 9. The method according to clause 8, further comprising providing a second gas inlet stream via a second gas inlet, the second gas inlet being positioned relatively higher in the reactor than the second gas outlet.

Clause 10. The method according to clause 9, further comprising recycling a portion of the second gas outlet stream back through the second gas inlet.

Clause 11. The method according to any one of clauses 1-10, wherein 60-75% of the inlet gas stream is provided in the first gas outlet stream.

Clause 12. The method according to any one of clauses 1-11, wherein at least 95% of carbon species in the first gas outlet stream is carbon dioxide ($CO_2$).

Clause 13. The method according to any one of clauses 1-12, wherein the metal particles comprise iron ore.

Clause 14. The method according to any one of clauses 1-13, wherein the inlet gas stream comprises carbon monoxide (CO) and hydrogen ($H_2$).

Clause 15. A method for operating a reactor having a top and a bottom, the method comprising:

providing, in a first flow direction, metal oxide particles to a solids inlet of the reactor, where the metal oxide particles have at least two oxidation states; and wherein the metal oxide particles enter the solids inlet at a first oxidation state;

providing, in a second flow direction, a first inlet gas stream to a first gas inlet proximate the bottom of the reactor, such that the first flow direction and the second flow direction are counter-current, providing a second inlet gas stream in the second flow direction to a second gas inlet of the reactor, the second gas inlet positioned closer to a top of the reactor than the first gas inlet;

providing a gas outlet stream via a gas outlet arranged near the top of the reactor, wherein the metal oxide particles below the second gas inlet comprise more oxygen than the metal oxide particles below the first gas inlet.

wherein at least 85% of carbon in the first gas outlet stream being in the form of carbon dioxide ($CO_2$); and discharging metal particles via a solids outlet positioned proximate a bottom portion of the reactor, the metal particles being at a second oxidation state that is different from the first oxidation state.

Clause 16. The method according to clause 15, further comprising discharging metal oxide particles via a second solids outlet arranged at a side of the reactor and above the bottom of the reactor.

Clause 17. The method according to clause 15 or clause 16, wherein the metal oxide particles are iron oxide particles; and wherein the second gas inlet stream comprises carbon dioxide ($CO_2$), carbon monoxide (CO), and hydrogen ($H_2$).

Clause 18. A reactor in a chemical looping system, the reactor comprising:

a solids inlet arranged to provide metal oxide particles in a first flow direction, where the metal oxide particles have at least two oxidation states; and wherein the metal oxide particles enter the solids inlet at a first oxidation state;

a first gas inlet arranged to provide an inlet gas stream in a second flow direction such that the first flow direction and the second flow direction are counter-current, the first gas inlet positioned near a bottom of the reactor;

a second gas inlet arranged to provide a gas stream in the second flow direction, the second gas inlet positioned closer to a top of the reactor than the first gas inlet;

a gas outlet arranged near the top of the reactor and configured to provide a gas outlet stream, wherein the metal oxide particles below the second gas inlet comprise more oxygen than the metal oxide particles below the first gas inlet.

wherein at least 85% of carbon in the first gas outlet stream being in the form of carbon dioxide ($CO_2$); and a solids outlet positioned near the bottom of the reactor and configured to provide metal oxide particles at a second oxidation state that is different from the first oxidation state.

Clause 19. The reactor according to clause 18, wherein the metal oxide particles are iron oxide particles.

Clause 20. The reactor according to clause 18 or clause 19, wherein the second gas inlet stream comprises carbon dioxide ($CO_2$), carbon monoxide (CO), and hydrogen ($H_2$).

The invention claimed is:

1. A method for operating a reactor having a top and a bottom, the method comprising:

providing, in a first flow direction, metal particles to a solids inlet of the reactor, wherein the metal particles have at least two oxidation states; and wherein the metal particles enter the solids inlet at a first oxidation state;

providing, in a second flow direction, an inlet gas stream to a gas inlet of the reactor, such that the first flow direction and the second flow direction are counter-current;

providing a first gas outlet stream via a first gas outlet arranged proximate a top of the reactor, wherein at least 85% of carbon species in the first gas outlet stream is in the form of carbon dioxide ($CO_2$);

providing a second gas outlet stream via a second gas outlet positioned below the first gas outlet;

discharging metal particles via a solids outlet positioned proximate a bottom portion of the reactor, the metal particles being at a second oxidation state that is different from the first oxidation state, wherein the metal particles comprise less oxygen at the solids outlet than directly below the second gas outlet; and discharging metal particles via a second solids outlet arranged at a side of the reactor and above the bottom of the reactor, wherein the metal particles discharged at the solids outlet comprise less oxygen than the metal particles discharged at the second solids outlet.

2. The method according to claim 1, further comprising recycling the second gas outlet stream at a position in the reactor that is relatively higher than the second gas outlet.

3. The method according to claim 1, the metal particles being discharged through the second solids outlet at a position that is relatively higher in the reactor than the second gas outlet.

4. The method according to claim 3, further comprising recycling the metal particles discharged through the second solids outlet back through a second solids inlet positioned lower in the reactor than the second solids outlet.

5. The method according to claim 1, further comprising providing a portion of the inlet gas stream in the first flow direction such that the portion of the inlet gas stream flows co-currently with the metal particles.

6. The method according to claim 5, wherein the gas inlet of the reactor is positioned at a side of the reactor positioned below the top of the reactor.

7. The method according to claim 1, wherein the gas inlet of the reactor is positioned at the bottom of the reactor.

8. The method according to claim 7, further comprising providing a second gas inlet stream via a second gas inlet, the second gas inlet being positioned relatively higher in the reactor than the second gas outlet.

9. The method according to claim 8, further comprising recycling a portion of the second gas outlet stream back through the second gas inlet.

10. The method according to claim 1, wherein 60-75% of the inlet gas stream is provided in the first gas outlet stream.

11. The method according to claim 1, wherein at least 95% of carbon species in the first gas outlet stream is carbon dioxide ($CO_2$).

12. The method according to claim 1, wherein the metal particles comprise iron ore.

13. The method according to claim 1, wherein the inlet gas stream comprises carbon monoxide (CO) and hydrogen ($H_2$).

* * * * *